United States Patent
Duffy et al.

(10) Patent No.: US 10,144,161 B2
(45) Date of Patent: Dec. 4, 2018

(54) INDIVIDUAL CAVITY FLOW CONTROL METHODS AND SYSTEMS FOR CO-INJECTION MOLDING

(71) Applicant: Milacron LLC, Cincinnati, OH (US)

(72) Inventors: John Duffy, Wenham, MA (US); Scott Hickey, East Longmeadow, MA (US)

(73) Assignee: MILACRON LLC, Cincinnati, OH (US)

( * ) Notice: Subject to any disclaimer, the term of this patent is extended or adjusted under 35 U.S.C. 154(b) by 618 days.

(21) Appl. No.: 14/210,350

(22) Filed: Mar. 13, 2014

(65) Prior Publication Data

US 2014/0306365 A1   Oct. 16, 2014

Related U.S. Application Data

(60) Provisional application No. 61/785,964, filed on Mar. 14, 2013.

(51) Int. Cl.
*B29C 45/77* (2006.01)
*B29C 45/00* (2006.01)
(Continued)

(52) U.S. Cl.
CPC ...... *B29C 45/0003* (2013.01); *B29C 45/1603* (2013.01); *B29C 45/1607* (2013.01); *B29C 45/1642* (2013.01); *B29C 45/2704* (2013.01); *B29C 45/2806* (2013.01); *B29C 45/77* (2013.01); *B29C 2045/1614* (2013.01); *B29C 2045/2687* (2013.01); *B29C 2045/2691* (2013.01); *B29C 2045/2872* (2013.01);
(Continued)

(58) Field of Classification Search
None
See application file for complete search history.

(56) References Cited

U.S. PATENT DOCUMENTS

| 4,279,582 A | 7/1981 | Osuna-Diaz |
| 4,554,190 A | 11/1985 | McHenry et al. |

(Continued)

FOREIGN PATENT DOCUMENTS

| EP | 1935607 A1 | 6/2008 |
| JP | H05253973 A | 10/1993 |

(Continued)

OTHER PUBLICATIONS

International Search Report and Written Opinion by the International Searching Authority for International Application No. PCT/US2014/026806 dated Aug. 7, 2014 (20 pages).

(Continued)

*Primary Examiner* — Monica A Huson
(74) *Attorney, Agent, or Firm* — Medler Ferro Woodhouse & Mills PLLC

(57) ABSTRACT

Methods and systems for co-extruding multiple polymeric material flow streams into a mold having a plurality of cavities to produce a plurality of multi-layer polymeric articles each having a consistent coverage of an interior core layer are disclosed herein. In an example method, a flow rate of a first skin material into a cavity is individually controlled for each cavity before initiation of co-injection of a second core material into the cavity, which may address inconsistent interior core layer coverage for articles from different cavities.

14 Claims, 18 Drawing Sheets

(51) Int. Cl.
   *B29C 45/16*   (2006.01)
   *B29C 45/27*   (2006.01)
   *B29C 45/28*   (2006.01)
   *B29C 45/26*   (2006.01)

(52) U.S. Cl.
   CPC ............... *B29C 2945/76555* (2013.01); *B29C 2945/76859* (2013.01); *B29C 2945/76889* (2013.01); *B29C 2945/76939* (2013.01)

(56) References Cited

U.S. PATENT DOCUMENTS

| | | |
|---|---|---|
| 5,914,138 A | 6/1999 | Swenson |
| 6,187,241 B1 | 2/2001 | Swenson |
| 6,596,213 B2 | 7/2003 | Swenson |
| 7,306,446 B2 | 12/2007 | Sabin et al. |
| 7,399,442 B2 | 7/2008 | Sabin et al. |
| 7,517,480 B2 | 4/2009 | Sabin et al. |
| 7,651,644 B2 | 1/2010 | Nahill et al. |
| 7,892,462 B2 | 2/2011 | Nahill et al. |
| 8,801,991 B2 | 8/2014 | Swenson |
| 2003/0012845 A1 | 1/2003 | Doyle et al. |
| 2004/0119182 A1 | 6/2004 | Kazmer |
| 2004/0247739 A1 | 12/2004 | Sabin et al. |
| 2005/0082707 A1* | 4/2005 | Sabin ................... B29C 45/766 264/40.1 |
| 2011/0212204 A1 | 9/2011 | Nahill et al. |
| 2011/0217496 A1 | 9/2011 | Swenson |
| 2012/0070532 A1 | 3/2012 | Ten et al. |
| 2014/0272283 A1 | 9/2014 | Swenson |

FOREIGN PATENT DOCUMENTS

| | | |
|---|---|---|
| WO | 9813188 A1 | 4/1998 |
| WO | 9845105 | 10/1998 |
| WO | 2004103668 A2 | 12/2004 |
| WO | 2011112613 A1 | 9/2011 |
| WO | 2012051721 A1 | 4/2012 |
| WO | 2014/152008 | 9/2014 |

OTHER PUBLICATIONS

Kazmer, David and Kapoor, Deepak: "Comparison of Sequential Valve Gate Molding to Multi-Cavity Melt Control Injection Molding", University of Massachusetts, Amherst (Dec. 12, 2003), pp. 1-23, XP002727733, http://kazmer.uml.edu/Staff/Archive/XXXX_DF_Seq_Valve.pdf [retrieved on Jul. 24, 2014].

Notice of Allowance issued in U.S. Appl. No. 14/327,221, dated Sep. 5, 2017.

Official Communication pursuant to Article 94(3) EPC from the EPO, in EP Application No. 14 721 087.6, dated Feb. 22, 2017.

U.S. Appl. No. 14/327,221, filed Jul. 9, 2014, Published.

* cited by examiner

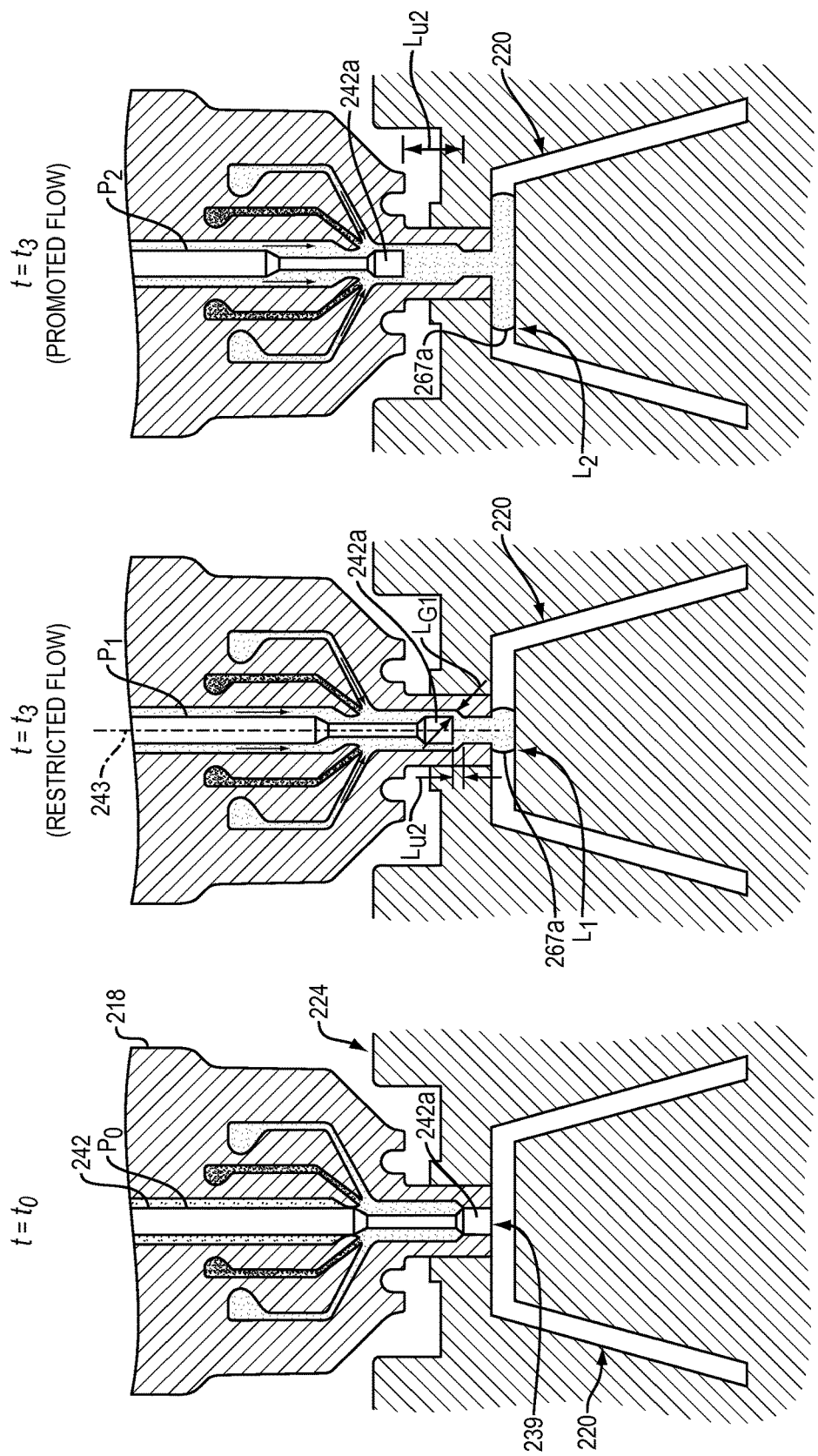

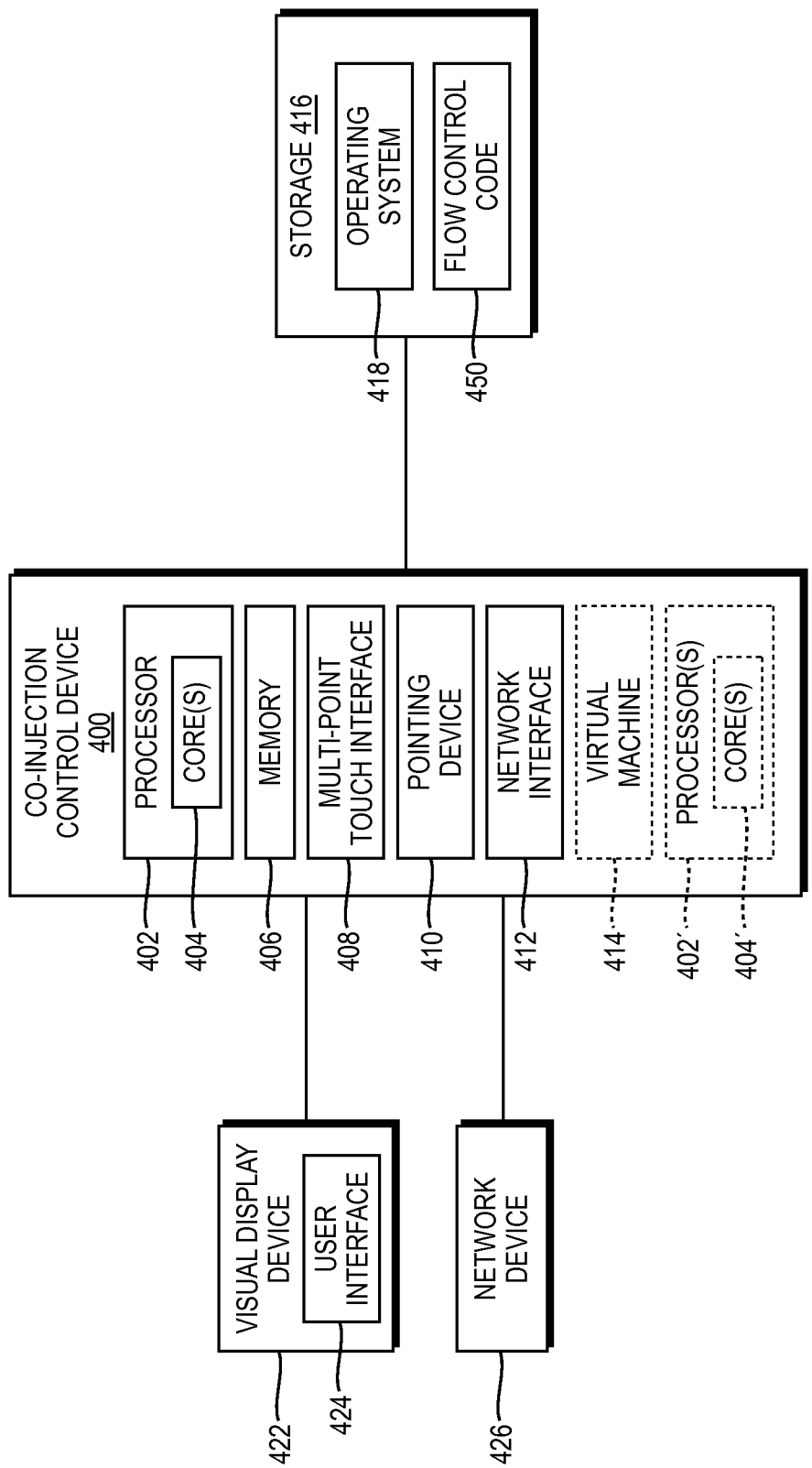

INDIVIDUAL CAVITY FLOW CONTROL METHODS AND SYSTEMS FOR CO-INJECTION MOLDING

RELATED APPLICATION

The present application claims benefit under 35 U.S.C. § 119(e) of U.S. Provisional Patent Application No. 61/785,964, filed Mar. 14, 2013, which is incorporated by reference herein in its entirety.

FIELD

Example embodiments are directed to methods and systems for forming multi-layer plastic articles, such as containers used to hold food, beverages, pharmaceuticals and nutraceuticals, and contact lenses, by injection molding in a mold having multiple cavities. In particular, example embodiments relate to methods and systems for co-injection molding multi-layer plastic articles with control of the timing of flow into each cavity.

BACKGROUND

Multi-layer plastic articles are often used as containers to hold, food, beverages, pharmaceuticals, and nutraceuticals. Some multi-layer plastic articles are commonly made from materials such as polyethylene (PET) and polypropylene (PP). Articles made from PET and PP resist environmental degradation, and are reasonably durable, watertight, and economically produced. However, plastic materials such as PET and PP are gas (e.g., oxygen, nitrogen, etc.) permeable. For applications in which gas permeability is undesirable, for example, containers for food products, medicines and products that degrade upon gaseous exposure, a plastic article of PET or PP may include an interior layer of a barrier material or a gas scavenger material, such as ethylene vinyl alcohol (EVOH), between skin layers of PET or PP.

A common configuration of multi-layer plastic articles includes an interior or "core" layer, which is surrounded on substantially all sides by another material forming inner and outer layers. For example, see U.S. Pat. Nos. 5,914,138 and 6,187,241, both assigned to Kortec, Inc. The disclosures of both of these patents are incorporated herein by reference. For example, the interior (core) layer may be formed of EVOH and the surrounding plastic layer, including inner and outer layers, may be formed from PET or PP. This construction produces a sandwich structure in which the inner and outer layers (e.g., PET) form both the exterior and the interior surfaces of the article, and the interior (core) layer (e.g., EVOH) is sandwiched therebetween.

For example, the position of the core layer (e.g., barrier layer) in co-injection applications for gas barrier containers is critical in achieving gas barrier performance of the container. If the location of the barrier layer is too low, the container will have areas in the side wall where there is no barrier coverage, which results in high rates of gas permeation in a localized area. If the barrier layer is too high, there is a risk the barrier material will break through the skin flow front and end up on the outside surface of the part, which is undesirable.

Multi-layer plastic articles, e.g., articles with inner and outer layers of one material and one or more interior layers of another material, may be co-injection molded using a mold having a plurality of cavities. When co-injection molding a multilayer material having an interior (core) layer and surrounding inner and outer (skin) layers, the injection stream entering the cavity must initially contain the skin material before the core material is added to the stream. This is because the center of the stream, including the core material, flows faster than the edges or sides of the stream, including the skin material, that are in contact with cavity walls. The skin material needs a "head start" so that the core material does not reach the flow front of the skin material before the end of the injection, which could deposit core material on an outside of the article. However, if the skin material is given too great of a "head start," the flow front of the core material does not substantially catch up with the flow front of the skin material during injection leaving a significant portion of the distal end of the article without any core layer.

Commonly, co-injection control systems are configured to initiate flow of the skin material from the nozzles into cavities simultaneously, and add core material to all flow simultaneously to all cavities simultaneously. In some systems the time delay between initiation of the flow of skin material and the addition of the core material is selected such that the core flow front will nearly catch up with, but not pass or break through the skin flow front during injection. In some systems configured for fold over of the internal core layer, the time delay between initiation of the flow of skin material and the addition of the core material is selected such that the core flow front will catch up with the skin flow front and fold over without breaking through the skin flow front.

Conventionally known injection molding techniques suitable for controlling placement and quality of materials in relatively thick multilayer articles (e.g., greater than 3 mm wall thickness) include thermally-balanced flow techniques and shooting pot techniques. In systems employing thermally-balanced techniques for producing relatively thick multilayer articles, the amount and timing of the introduction of the core materials and skin materials into the cavities are partially controlled by controlling the temperature of the skin material flow channels to a particular cavity relative to the skin material flow channels to the rest of the cavities, to achieve a desired flow rate into each cavity and volume of skin material flowing into each cavity before injection of the core material begins. By contrast, in systems employing shooting pot techniques for producing relatively thick-walled articles, shooting pots are used to determine the volume of core material and skin material fed into each cavity or group of cavities fed by that particular shooting pot. In injection molding apparatus for relatively thick-walled articles employing shooting pots, the volumetric stroke in one or more skin shooting pots will alter the position of the leading edge in one or more cavities, and changing the volumetric stroke in all skin shooting pots will alter the position in all cavities.

SUMMARY

Example embodiments described herein include, but are not limited to, methods, systems and non-transient computer-readable media for controlling interior layer coverage in multi-layer, thin-walled injection molded articles formed in different cavities of the same mold.

For example, an embodiment includes a method of co-injection molding a plurality of multi-layer articles using a corresponding plurality of cavities of a mold. The method includes individually controlling a flow rate of a first material into a cavity using a position of a valve pin in a corresponding nozzle of a plurality of nozzles for each cavity in the plurality of cavities. The method also includes co-injecting a second material into the cavity using the corresponding nozzle thereby forming an internal layer of the second material between an inner layer of the first material and an outer layer of the first material in the cavity for each cavity in the plurality of cavities.

In some embodiments, for each cavity, the flow rate of the first material into the cavity is individually controlled using the position of the valve pin of the corresponding nozzle before co-injection of the second material. In some embodiments, the method further includes individually controlling a total flow rate of material into the cavity using the position of the valve pin of the corresponding nozzle after initiation of co-injection of the second material for each cavity.

In some embodiments, a profile for a flow rate of the first material into the cavity as a function of time is determined based on an article previously produced using the cavity. In some embodiments a profile for a flow rate of the first material into the cavity is automatically adjusted based on a detected property of an article previously produced using the cavity.

In some embodiments, each nozzle forms an outer stream of the first material, an inner stream of the first material, and an interior stream of the second material during co-injection of the second material. The method may also include blocking flow of the inner stream of the first material within the corresponding nozzle to cease flow of the inner stream while continuing flow of the outer stream and flow of the interior stream into the cavity for each cavity of the plurality of cavities. In some embodiments, blocking flow of the inner stream of the first material within the corresponding nozzle includes retracting a valve pin of the nozzle away from the cavity.

In some embodiments, the method also includes delaying initiation of flow of the first material into a second cavity of the plurality of cavities relative to initiation of flow of the first material into a first cavity of the plurality of cavities. A time delay between initiation of flow of the first material into a cavity and initiation of co-injection of the second material into the cavity may be described as a skin-core time delay for the cavity. In some embodiments, the method also includes specifying a first skin-core time delay for a first cavity in the plurality of cavities and specifying a second skin-core time delay, different than the first skin-core time delay, for a second cavity in the plurality of cavities.

In some embodiments, the method individually controls a position of a leading edge of an internal layer in each of the plurality of multi-layer articles.

Another embodiment is a method of forming a plurality of multilayer injection-molded articles using a corresponding plurality of cavities of a mold. The method includes injecting a first material into a first cavity of the plurality of cavities using a first nozzle with a valve pin of the first nozzle in a first position before co-injection of a second material into the first cavity. The method also includes injecting the first material into a second cavity of the plurality of cavities using a second nozzle with a valve pin of the second nozzle in a second position different than the first position thereby restricting flow of the first material into the second cavity before co-injection of the second material into the second cavity. The method includes co-injecting the second material into the first cavity using the first nozzle thereby forming an internal layer of a second material between an inner layer of the first material and an outer layer of the first material in the first cavity. The method also includes co-injecting the second material into the second cavity using the second nozzle thereby forming an internal layer of a second material between an inner layer of the first material and an outer layer of the first material in the second cavity.

In some embodiments, a first flow rate of the first material into the first cavity before co-injection of the second material into the first cavity is controlled using a position of the valve pin of the first nozzle. In some embodiments, a second flow rate of the first material into the second cavity before co-injection of the second material into the second cavity is controlled using a position of the valve pin of the second nozzle.

In some embodiments, the first flow rate of the first material into the first cavity is determined based on an article previously produced using the first cavity and the second flow rate of the first material into the second cavity is determined based on an article previously produced using the second cavity.

Another embodiment includes a system for co-injection of multi-layer articles. The system includes a mold defining a plurality of cavities, each cavity corresponding to a resulting multi-layer article. The system also includes a plurality of nozzles, each of the plurality of nozzles corresponding to one of the plurality of cavities. Each nozzle is configured to inject a first material into a corresponding cavity and configured to co-inject a second material into the cavity for forming an interior layer of the second material between an inner layer of the first material and an outer layer of the first material in each cavity. Each nozzle includes a flow rate control device for controlling a flow rate of material injected into the cavity. The system also includes a processor programmed to individually control a rate of flow of the first material into the cavity using the flow rate control device of the corresponding nozzle before co-injection of the second material into the cavity for each cavity.

In some embodiments, the processor is further programmed to individually control a total flow rate of material into the cavity for each cavity using the flow rate control device of the corresponding nozzle after initiation of co-injection of the second material. In some embodiments the flow rate control device includes a valve pin of the nozzle for each nozzle. In some embodiments, individually controlling the flow rate of the first material for each cavity using the flow control device includes controlling a position of the valve pin for each nozzle during injection of the first material.

In some embodiments, a flow rate of the first material into the cavity is determined based on an article previously produced using the cavity for each cavity. In some embodiments, the processor is further configured to block flow of the inner stream of the first material within the corresponding nozzle to cease flow of the inner stream while continuing flow of the outer stream and flow of the interior stream into the cavity for each cavity. Blocking flow of the inner stream of the first material within the corresponding nozzle may include retracting a valve pin of the nozzle away from the cavity.

In some embodiments, the processor is further programmed to delay initiation of flow of the first material into a second cavity of the plurality of cavities relative to initiation of flow of the first material into a first cavity of the plurality of cavities. In some embodiments, the processor is further programmed to specify a first skin-core time delay for a first cavity in the plurality of cavities and specify a second skin-core time delay different than the first skin-core time delay for a second cavity in the plurality of cavities.

Another embodiment includes a system for co-injection of multi-layer articles. The system includes a mold defining a plurality of cavities, each cavity corresponding to a resulting multi-layer article. The system also includes a plurality of nozzles each of the plurality of nozzles corresponding to one of the plurality of cavities. Each nozzle may be configured to inject a first material into a corresponding cavity and configured to co-inject a second material into the cavity for forming an interior layer of the second material between an inner layer and an outer layer of the first material in each cavity. In some embodiments, each nozzle includes a valve pin for controlling a flow rate of material injected into the cavity. The system also includes a processor programmed to inject the first material into a first cavity of the plurality of cavities using a first nozzle with the valve pin of the first nozzle in a first position before co-injection of a second material into the first cavity. The processor is also programmed to inject the first material into a second cavity of the plurality of cavities using a second nozzle with the valve pin of the second nozzle in a second position different than the first position restricting flow of the first material into the second cavity before co-injection of the second material into the second cavity. The processor is programmed to co-inject the second material into the first cavity using the first nozzle, thereby forming an internal layer of the second material between an inner layer of the first material and an outer layer of the first material in the first cavity. The processor is also programmed to co-inject the second material into the second cavity using the second nozzle, thereby forming an internal layer of the second material between an inner layer of the first material and an outer layer of the first material in the second cavity.

In some embodiments, the processor is further programmed to delay initiation of flow of the first material into the second cavity relative to initiation of flow of the first material into the first cavity. In some embodiments, the processor is further programmed to specify a first skin-core time delay for the first cavity and specify a second skin-core time delay, different than the first skin-core time delay, for the second cavity.

In some embodiments, the processor is programmed to block flow of the inner stream of the first material within the nozzle to cease flow of the inner stream while continuing flow of the outer stream and of the interior stream for each of the first nozzle and the second nozzle. In some embodiments, blocking flow of the inner stream of the first material within the nozzle includes retracting a valve pin of the nozzle away from the corresponding cavity.

Another embodiment includes a non-transitory computer-readable medium storing computer executable instructions for producing a plurality of co-injection-molded multi-layer articles using a system including a mold defining a corresponding plurality of cavities and including a plurality of nozzles. The instructions include instructions for individually controlling a flow rate of a first material into the cavity using a corresponding nozzle of a plurality of nozzles for each cavity in the plurality of cavities. The instructions also include instructions for co-injecting a second material into the cavity using the corresponding nozzle thereby forming an internal layer of the second material between an inner layer of the first material and an outer layer of the first material in the cavity for each cavity in the plurality of cavities.

An embodiment includes a method of co-injection molding a plurality of multi-layer articles using a corresponding plurality of cavities. The method includes initiating flow of a first polymeric material from a first nozzle into a first of the plurality of cavities at a first time. The method also includes initiating flow of the first polymeric material from a second nozzle into a second of the plurality of cavities at a second time. The method includes co-injecting a second polymeric material into the first of the plurality of cavities after a first specified time delay relative to the first time forming an interior layer of the second polymeric material between an inner layer of the first polymeric material and an outer layer of the first polymeric material. The method also includes co-injecting a second polymeric material into the second of the plurality of cavities after a second specified time delay relative to the first time forming an interior layer of the second polymeric material between an inner layer of the first polymeric material and an outer layer of the first polymeric material, with the second specified time delay being different than the first specified time delay.

In some embodiments, initiating flow of the first polymeric material from the first nozzle into the first of the plurality of cavities at the first time includes displacing a first valve pin of the first nozzle at the first time, and initiating flow of the first polymeric material from second nozzle into the second of the plurality of cavities at the second time includes displacing a second valve pin of the second nozzle at the second time.

In some embodiments, the second time may be different than the first time. In some embodiments co-injection of the second polymeric material into the first of the plurality of cavities occurs simultaneously with co-injection of the second polymeric material into the second of the plurality of cavities. In some embodiments, the first time is the same as the second time. In some embodiments, the first specified time delay and the second specified time delay are determined from a first article previously formed in the first cavity and a second article previously formed in the second cavity.

Another embodiment includes a system for co-injection of multilayer plastic articles. The system includes a mold defining a plurality of cavities, each cavity corresponding to a resulting plastic article. The system also includes a plurality of nozzle assemblies, each of the plurality of nozzle assemblies corresponding to one of the plurality of cavities. Each nozzle assembly is configured to inject a first material into a corresponding cavity and configured to co-inject a second material into the cavity for forming an interior layer of the second material between an inner layer and an outer layer of the first material in each cavity. Each nozzle assembly includes a flow initiation device for enabling flow of the first material into the corresponding cavity. The system also includes a processor programmed to individually control each flow initiation device for initiating flow in at least one of the plurality of cavities at a different time than flow is initiated in another of the plurality of cavities. In some embodiments, each flow initiation device includes a valve pin associated with one of the plurality of nozzle assemblies and a corresponding one of the plurality of cavities.

Another embodiment includes a system for co-injection of multilayer plastic articles. The system includes a mold defining a plurality of cavities with each cavity corresponding to a resulting plastic article. The system also includes a plurality of nozzle assemblies. Each of the plurality of nozzle assemblies corresponds to one of the plurality of cavities. Each nozzle assembly is configured to inject a first material into a corresponding cavity and configured to co-inject a second material into the cavity for forming an interior layer of the second material between an inner layer of the first material and an outer layer of the first material in each cavity. The system also includes and a co-injection controller configured to execute instructions. The instructions are for initiating flow of the first material from a first nozzle into a first of the plurality of cavities at a first time. The controller is also configured to execute instructions for initiating flow of the first material from a second nozzle into a second of the plurality of cavities at a second time. The controller is also configured to execute instructions for co-injecting the second material into the first of the plurality of cavities after a first specified time delay relative to the first time. The controller is further configured to execute instructions for co-injecting the second material into the second of the plurality of cavities after a second specified time delay relative to the first time, with the second specified time delay being different than the first specified time delay.

An embodiment includes a non-transitory computer-readable medium storing computer executable instructions for producing a co-injection-molded plastic article using a system including a mold defining a plurality of cavities and including a plurality of nozzle assemblies. The instructions include instructions for initiating flow of the first material from a first nozzle into a first of the plurality of cavities at a first time. The instructions also include instructions for initiating flow of the first material from a second nozzle into a second of the plurality of cavities at a second time. The instructions include instructions for co-injecting the second material into the first of the plurality of cavities after a first specified time delay relative to the first time forming an interior layer of the second polymeric material between an inner layer of the first polymeric material and an outer layer of the first polymeric material. The instructions also include instructions for co-injecting the second material into the second of the plurality of cavities after a second specified time delay relative to the first time forming an interior layer of the second polymeric material between an inner layer of the first polymeric material and an outer layer of the first polymeric material, with the second specified time delay being different than the first specified time delay.

Some embodiments include a non-transitory computer-readable medium storing computer-executable instructions for producing a plurality of co-injection-molded multi-layer articles in accordance with any of the methods described herein.

BRIEF DESCRIPTION OF THE DRAWINGS

The drawings are intended to illustrate the teachings taught herein and are not intended to show relative sizes and dimensions, or to limit the scope of examples or embodiments. In the drawings, the same numbers are used throughout the drawings to reference like features and components of like function.

FIG. 12 schematically depicts the nozzle of FIG. 9 and a corresponding cavity of a mold with the valve pin of the nozzle in a position blocking flow of material into the cavity.

FIG. 13 schematically depicts the nozzle and corresponding cavity with the valve pin in a first partially retracted position for restricted flow of the first material before co-injection of the second material.

FIG. 14 schematically depicts the nozzle and corresponding cavity with the valve pin in a second partially retracted position for promoted flow of the first material before co-injection of the second material.

FIG. 30 schematically illustrates an exemplary computing environment suitable for practicing some embodiments.

DETAILED DESCRIPTION

For co-injection molding of multilayer articles, the inventors recognized that a uniform delay across all cavities in the addition of core material to the flow after initiation of skin material flow into all cavities often results in articles from different cavities having different amounts of core layer coverage, (i.e., different positions for the location of the leading edge of the core layer in different articles). This is especially pronounced for thin-walled articles. The inventors determined that conventional thermal balancing and shooting pot techniques for controlling leading edge positions of skin layers and core layers in co-injected molded articles often provide insufficient control to obtain uniform leading edge positions from cavity to cavity for thin-walled articles (e.g., articles with a wall thickness of less than 0.5 mm, or articles with a wall thickness of between about 0.25 mm and 0.5 mm).

The variation in core layer coverage between different cavities may be influenced by many different variables, which include, but are not limited to: hot runner temperature, valve pin actuation, pre-decompression amount, hot runner flow bore design and layout, gas temperature, start of the core flow, mold design, mold alignment, mold cooling and mold temperature. Before describing how some embodiments address the issue of different cavities having different amounts of core layer coverage in co-injected articles, the variables affecting variation in core layer coverage are described.

Temperatures throughout the flow path of a melt flow affect the viscosities of the skin and core materials, which influence the rates at which the materials flow. Hot and cold spots over the length of the flow path, which may be 20-40° C. degrees of variability in a well-designed system, as well as localized heat due to shear, contribute to non-uniform skin and core flow from cavity to cavity. Hot runner nozzle temperature can be used to at least partially compensate for non-uniform skin and core flow from cavity to cavity. For example, see U.S. Pat. No. 7,399,442, assigned to Kortec, Inc., the contents of which are incorporated herein in their entirety. However, for thin-walled articles of materials such as polypropylene, large nozzle temperature changes would be needed to at least partially improve the flow rate uniformity.

Figure 1:
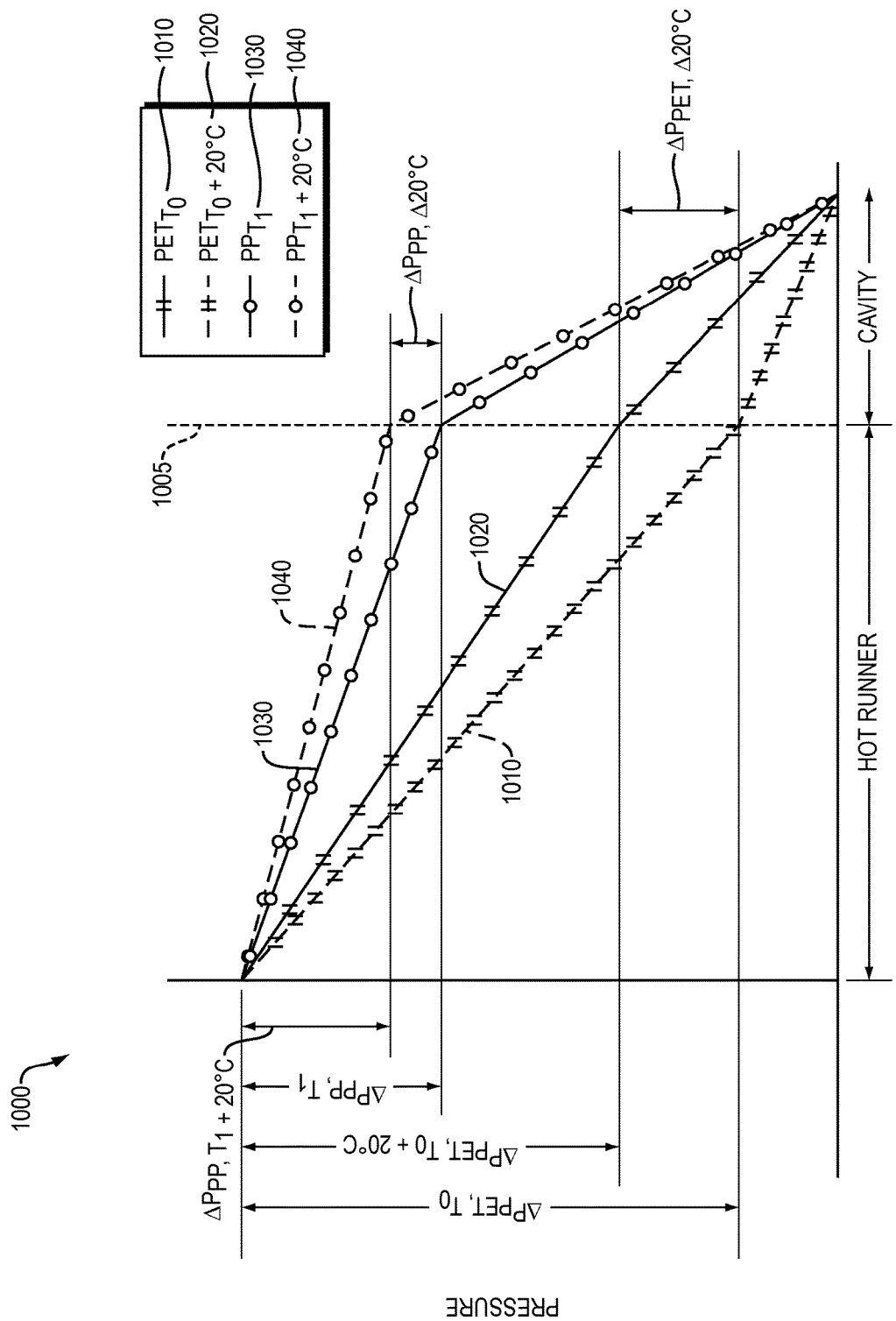
FIG. 1 schematically depicts an example graph of pressure as a function of distance along a flow path for PET flowing through a hot runner and a mold cavity for a thick walled article and for PP flowing through a hot runner and a mold cavity for a thin walled article.

For example, FIG. 1 includes a graph 1000 schematically depicting pressure as a function of distance for a PET flow traveling through a hot runner system and into a mold cavity for a thick walled article, and pressure as a function of distance for a PP flow traveling through the hot runner system and into a mold cavity for a thin-walled article. Graph 1000 of FIG. 1 illustrates why it is easier to control flow rate of a skin material using hot runner temperature for thin-walled articles than for thick-walled articles, and why it is easier to control flow rate using hot runner temperature for materials with a larger temperature dependence of viscosity.

Line 1010 shows the pressure of the PET flow through the hot runner portion of the system and into a cavity for a thick-walled article with the hot runner portion at a given temperature $T_0$. Line 1005 indicates where the flow leaves the hot runner/nozzle portion of the system at a gate and enters the cavity. In the graph, the pressure drop in the PET flow across the hot runner system when the temperature is $T_0$ is labeled $\Delta P_{PET,T0}$. Line 1020 depicts the pressure of the PET flow in the system with the hot runner portion of the system at a temperature twenty degrees Celsius higher (i.e., $T_0+20°$ C.). The pressure drop in the PET across the hot runner system with the higher temperature ($T_0+20°$ C.) is labeled $\Delta P_{PET,T0+20° C}$. As shown, the increased hot runner temperature leads to a smaller pressure drop of the PET flow across the hot runner portion of the system and a correspondingly higher pressure for the PET flow as it enters the cavity at line 1005. This difference in the pressure of the PET flow upon entering the cavity for the different hot runner temperatures ($\Delta P_{PET,\Delta 20° C}$) creates a difference in the flow rate of the PET into the cavity. Specifically, keeping the hot runner portion of the system at a higher temperature increases the pressure of the PET flow entering the cavity by an amount $\Delta P_{PET,T0+20° C}$, which increases the flow rate of the PET entering the cavity. Thus, controlling the temperature of different portions of the hot runner system leading to different cavities can, at least partially, address non-uniformities in PET flow rates across different cavities when injected into a mold with cavities for thick-walled articles.

Lines 1030 and 1040 depict the pressure of a PP flow as a function of distance in a system when the PP flows through a hot runner portion of the system and into a mold cavity for a thin-walled article. Line 1030 depicts PP flow through the system with the hot runner portion of the system at a given temperature $T_1$, and line 1040 depicts the PP flow through the system with the hot runner portion of the system at a temperature twenty degrees higher (i.e., $T_1+20°$ C.). The temperature $T_1$ may be different than the temperature $T_0$ used for the PET flow into the mold cavity for the thick-walled article. In the graph, the pressure drop in the PP flow across the hot runner system when the temperature is $T_1$ is labeled $\Delta P_{PP,T1}$. Pressure drop in the PP flow across the hot runner system with the higher temperature ($T_1+20°$ C.) is labeled $\Delta P_{PET,T1+20° C}$. As shown, the increased hot runner temperature (i.e., $T_1.+20°$ C.) leads to the pressure of the PP flow as it enters the cavity being increased by $\Delta P_{PET,\Delta 20° C}$. However, as shown in the graph, the pressure difference in a PP flow when entering a cavity for a thin-walled article resulting from a twenty degree Celsius increase in hot runner temperature is much smaller than the pressure difference in a PET flow when entering a cavity for a thick-walled article for the same change in temperature ($\Delta P_{PP,\Delta 20° C}<\Delta P_{PET,\Delta 20° C}$). Because the pressure difference at the gate due to the increase in temperature is smaller for the PP flow into a cavity for a thin-walled article than for the PET flow into a cavity for a thick-walled article, the difference in flow rate at the gate due to the temperature change is also smaller. Thus, altering a runner temperature to a cavity is much less effective for controlling the flow rate of PP into a cavity for a thin-walled article than for controlling the flow rate of PET into a cavity for a thick-walled article.

There are at least three different reasons for the reduced effect of the same temperature change of the hot runner portion of the system on the pressure of the PP flow entering the cavity for a thin-walled article as compared to the pressure of the PET flow entering a cavity for a thick-walled article. First, generally speaking, a cavity for a thin-walled article has a higher flow path resistance than a cavity for a similar thick-walled article. When comparing injection of a material into a cavity for a thin-walled article with injection of the same material into a cavity for a thick-walled article, the larger flow path resistance of the cavity for the thin-walled article means that a larger proportion of the total pressure drop across the system occurs in the cavity for the thin-walled article than for the thick-walled article. This corresponds to proportionately less pressure being lost over the hot runner portion of the system, meaning that changes in the temperature of the hot runner system have proportionally less effect on the pressure at the gate.

Second, generally speaking, the viscosity of PET is more temperature-dependent than the viscosity of PP, meaning that the same change temperature would create a greater change in viscosity for PET than for PP. The greater change in viscosity for a given temperature change in the hot runner system would result in a greater change in the pressure drop across the hot runner portion of the system for a PET flow than for a PP flow.

Third, generally speaking, at injection molding temperatures, the viscosity of PET is higher than the viscosity of PP. The higher viscosity of PET means that proportionally more of the pressure is dropped over the hot runner portion of the system for PET than for PP, which results in proportionately larger pressure changes due to changes in temperature.

Because changing hot runner temperature has a smaller effect on the pressure of the flow at the gate for PP into a cavity for a thin-walled article than on the pressure of the flow at the gate for PET into a cavity for a thick-walled article, correcting differences in flow rate into different cavities would require much larger temperature changes for the PP melt for a thin-walled article than for the PET melt for a thick-walled article. Such large temperature differentials for different portions of a hot runner system may be difficult or impossible to achieve or maintain. Thus, using the temperature of a hot runner portion of a mold to correct differences in flow rates into different cavities may be more difficult or impossible for flow into cavities for thin-walled articles and/or for materials with a relatively small temperature dependence of melt flow viscosity.

Figure 2:
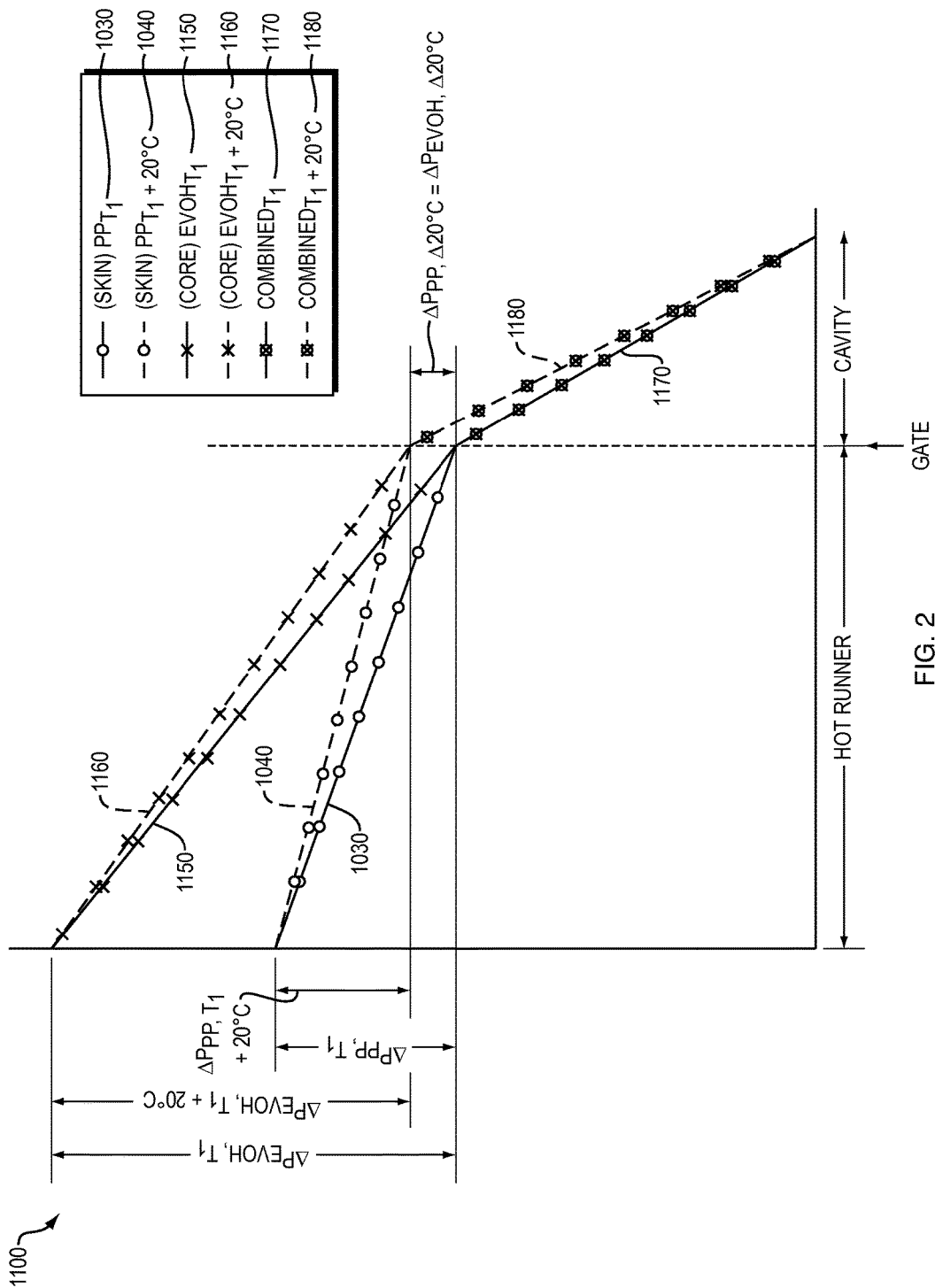
FIG. 2 schematically depicts an example graph of pressure as a function of distance along a flow path for EVOH material flowing as an interior skin layer through a hot runner system and a mold cavity for a thin walled article.

Graph 1100 of FIG. 2 schematically depicts the effect of raising the temperature of the hot runner portion of a system on the pressure of a skin material flow (e.g., PP) and on the pressure of a core material flow (e.g., EVOH) when co-injecting a core material and a skin material into a cavity for a thin-walled article. Line 1030 represents the pressure of the PP skin material flow with the hot runners at a temperature $T_1$ and line 1040 represents the pressure of the PP skin material flow with the hot runner at an elevated temperature $T_1+20°$ C. As shown, the difference in pressure of the PP skin material when it enters the cavity due to the difference in the hot runner temperature is $\Delta P_{PP,\Delta 20° C.}$, which may results in some change in the flow rate the PP skin material flow into the cavity for the thin-walled article.

However, the increase in the temperature of the hot runner portion of the system also affects the EVOH core material flow. Line 1150 depicts the pressure as a function of distance for an EVOH flow in a system with the hot runner at the temperature $T_1$, which shows a drop in the pressure of the EVOH flow of $\Delta P_{EVOH,T1}$ over the hot runner portion of the system. Line 1160 depicts the pressure of the EVOH flow in the system with a hot runner at a temperature twenty degrees Celsius higher (i.e., at $T_1+20°$ C.), which shows a drop in pressure of the EVOH flow of $\Delta P_{EVOH,T0+20° C.}$ over the hot runner portion of the system. Thus, raising the temperature of the hot runner portion of the system by twenty degrees changes the pressure of the EVOH flow at the gate by $\Delta P_{EVOH,\Delta 20° C.}$.

Because the PP core material flow and the EVOH skin material flow are combined when they are injected into the cavity for the think-walled article, they have the same pressure after they enter the cavity. Specifically, at temperature $T_1$ the pressure of the PP skin flow and the pressure of the EVOH core flow overlay on line 1170 after entering the cavity. At temperature $T_1+20°$ C., the pressure of the PP skin flow and the pressure of the EVOH core flow overlay on line 1180 after entering the cavity. As shown in the diagram, the difference in the pressure of the EVOH core flow at the gate due to the increase in hot runner temperature is the same as the difference in the pressure of the PP skin flow at the gate due to the increase in hot runner temperature (i.e., $\Delta P_{EVOH,\Delta 20° C.} = \Delta P_{EVOH,\Delta 20° C.}$). This increase in the pressure of the EVOH flow upon entering the cavity $\Delta P_{EVOH,\Delta 20° C.}$ at elevated temperature increases the flow rate of EVOH into the cavity. Increasing the flow rate of the EVOH core material into the cavity may be undesirable because it may alter the ratio of skin material flow to core material flow in the combined flow stream and/or may increase the total amount of EVOH injected into the cavity. Thus, controlling the flow rate of the skin material into a cavity using the hot runner temperature may be undesirable due to the effect of the change in hot runner temperature on the flow rate of the core material.

Graphs 1000 and 1100 are example schematic graphs of pressure through the hot runner and mold cavity of an injection molding system. The characteristics of the graphs for other systems or other molds depend on the properties of the material being injected, the system used the temperatures used, and the geometry and dimensions of the mold cavity.

For a valve-gated hot runner system, it is assumed the valve pins for various nozzles open at the same time to allow material flow into the cavity. However, even if a controller initiates valve pin opening at the same time for all cavities, valve pins may not open simultaneously for all cavities. For pneumatic and hydraulic pin actuation, the length, diameter and layout of the pneumatic or hydraulic lines can affect the ability of the pins to open simultaneously. Also, friction between the pin and nozzle surfaces, as well as material viscosity, can affect whether the pins in the system open simultaneously.

An amount of skin material that enters a core side of the nozzle during pre-decompression (after the previous shot) may not be uniform across all nozzles. This affects how much skin material is ahead of the barrier at the start of the next shot, which influences leading edge position of the core layer in the resulting article.

Frictional heat due to shear is highest at the runner walls. The frictional heat affects material viscosity in the skin material, which may behave as a non-Newtonian fluid when flowing through runner portion of the mold during injection. Due to non-Newtonian, laminar flow of the skin material in the runner portion of the mold, the material flowing at or near the runner walls will favor certain cavities in the mold, which will, in turn, affect the uniformity of flow to those cavities relative to other cavities.

The temperature at the gate affects the ability of the material to start flowing when the valve pin opens. The temperature at the gate is affected by many variables including mold temperature, mold cooling design, nozzle temperature and incoming material temperature.

When core material flow is initiated, the pressure of the core material in the core flow channels must rise uniformly for the leading edge of the core material to simultaneously flow into all cavities. Simultaneous flow of the leading edge of the core material into all cavities may be affected by the local core material viscosity, runner sizing and layout, and the temperature delta over the core flow path.

When the mold closes, the cavities and cores must be aligned so that the cross-sectional area for flow is uniform from cavity to cavity. Any variation in part wall thickness due to mold design, mold tolerances, or mold alignment can affect the uniformity of flow from cavity to cavity. Further, temperature differences across the mold can contribute to no-uniform flow from cavity to cavity affecting leading edge position.

It would be technically difficult or impossible to sufficiently control all of the factors above to achieve uniform flow rates co-injection molding across molds with a typical commercial number of cavities (e.g., four, eight, sixteen, thirty-two, etc.) when forming thin-walled articles. Some exemplary methods and systems address the issue of non-uniform leading edge positions of core layers in resulting articles from cavity to cavity in a mold by individually controlling the time delay between initiation of skin flow and initiation of core flow for each cavity, which may be described herein as a specified skin-core delay for the cavity. The specified skin-core delay for a cavity may be controlled by individually controlling the time for initiation of skin flow into the cavity, by individually controlling the time for initiation of core flow into the cavity, and/or both. In some embodiments, a variation from a desired leading edge core position for an article previously produced in a cavity may determine the specified skin-core delay for the cavity to be used in molding another article in the cavity.

Some exemplary methods and systems address the issue of non-uniform leading edge position of a core layer in resulting articles from cavity to cavity in a mold by individually controlling, for each cavity, a flow rate of the first material into the cavity using a corresponding nozzle before co-injection of the second material into the cavity. Further, in some embodiments, for each cavity, a total flow rate of material into the cavity may be individually controlled using the corresponding nozzle.

Some exemplary methods and systems address the issue of non-uniform leading edge positions of a core layer in resulting articles from cavity to cavity in a mold by both individually controlling skin-core delay timing for each cavity and by individually controlling a flow rate of the first material into each cavity.

Figure 3:
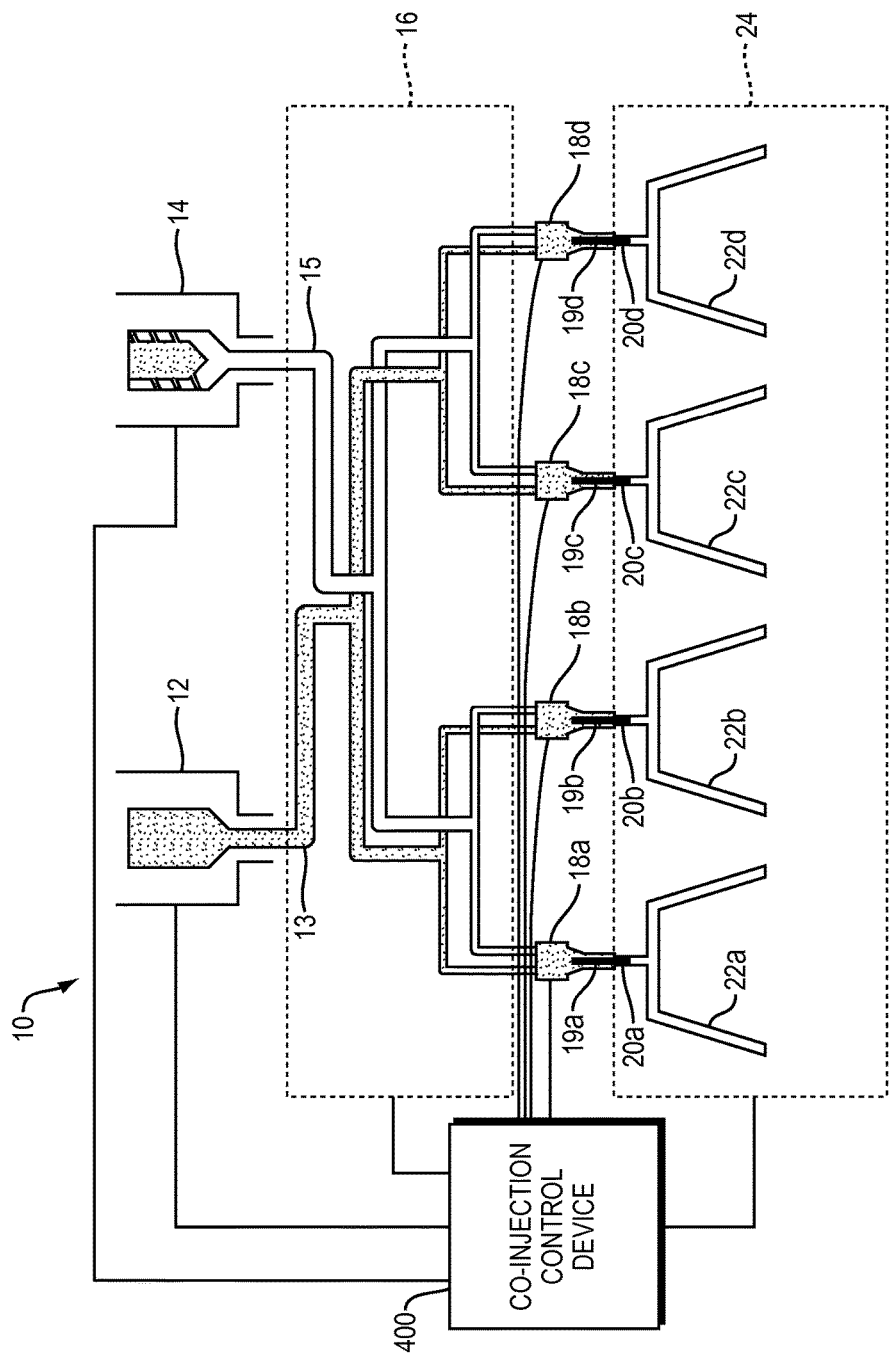
FIG. 3 is a schematic cross-sectional view of a co-injection molding system for producing multi-layer molded plastic articles, in accordance with some embodiments.

FIG. 3 illustrates a system 10 suitable for practicing exemplary embodiments. Co-injection molding system 10 is configured to co-inject at least two polymeric plastic material streams into a mold cavity to produce one or more articles each having multiple co-injected plastic layers. Co-injection molding system 10 includes a first material source 12, and a second material source 14. First material source 12 supplies a first polymeric material for use in forming at least one layer of a resulting molded plastic article. Second material source 14 supplies a second polymeric material for use in forming at least one layer of the resulting molded plastic article. System 10 co-injects multiple streams (e.g., an inner stream, an outer stream, and an interior stream) to form multiple layers of a resulting article. Materials suitable for use with embodiments of the invention include, but are not limited to, polymer-based materials such as, polyethylene terephthalate (PET), ethylene vinyl alcohol (EVOH), MXD6 nylon, polypropylene (PP), and polycarbonates (PC). In some embodiments, the inner and outer streams are the same or different polymeric materials. For example, in some embodiments, the inner and outer streams which form inner and outer layers are PET, while an interior stream used to form an interior layer is a material chosen to enhance the overall performance of the resulting article, or to reduce the cost of the resulting article. For example, one or more interior streams for interior layers may include one or more of a barrier material (MXD6 Nylon or EVOH), an oxygen scavenging material, a recycled material, or other performance-enhancing or cost-reducing material. The type of material used for the interior layer/stream is often different from the type of material used for the inner and outer layers/streams.

System 10 may also include a manifold 16 for delivery of polymeric material. In some embodiments, a manifold may consist of separate manifolds for each polymeric material. Co-injection molding system 10 further includes nozzle assemblies 18a, 18b, 18c, 18d and mold 24. Mold 24 defines gates 20a, 20b, 20c, 20d, and cavities 22a, 22b, 22c, 22d. In FIG. 3, each nozzle assembly 18a-18d has a corresponding gate, cavity, and recess. For example, nozzle assembly 18a corresponds to gate 20a, and cavity 22a.

A first polymeric material, referred to herein as a first material, is extruded from first material source 12 and a second polymeric material, referred to herein as a second material, is extruded from second material source 14. System 10 includes a first flow channel 13 of manifold 16 configured to distribute the first material to one or more of nozzles 18A-18D, and a second flow channel 15 of manifold 1600 configured to distribute the second material to one or more of nozzles 18a-18d. First material and second material combine into a co-polymeric stream in nozzles 18a-18d, which is injected into mold cavities 22a-22d for molding resulting articles. Each nozzle 18a-18d may include a flow initiation element (e.g., a valve pin 19a, 19b, 19c, 19d), which is used to control initiation of flow of the first material into the corresponding cavity. In nozzles 18a-18d, the first material stream and the second material stream are combined to form an annular combined polymeric stream such that the second material forms an interior stream in the combined polymeric stream while the first material forms the inner and outer streams in the combined stream. The inner and outer streams encase the interior stream as the annular combined polymeric stream is injected from the nozzle. Methods for co-injecting multiple polymeric materials to form plastic articles with multiple layers of different materials are generally known, such as described in U.S. Pat. No. 6,908,581 and the documents incorporated therein, each of which is also incorporated by reference herein in its entirety. Further details regarding how a combined polymeric plastic stream is produced in the injection nozzle are provided in the description of FIG. 4 below.

In some examples described herein, the first material is described as a skin material and the second material is described as a core material. The terms skin material and core material merely denote that in the resulting article, a layer of the first material overlays a layer of the second material on one or both sides. The skin material need not be the outermost layer of the resulting article and the core material need not be a central interior layer of the resulting article. In some embodiments, the layer of the second material is located between layers of the first material. In some embodiments, an inner "skin" layer of the article may be formed from a different material than an outer "skin" layer of the article.

Although system 10 is depicted including four nozzle assemblies (18a-18d) having four flow initiation elements (19a-19d) and a mold 24 that defines four gates (20a-20d) and four cavities (22a-22d) for forming four plastic articles simultaneously, one of ordinary skill in the art will appreciate that other embodiments may include different numbers of nozzle assemblies, gates and cavities for forming different numbers of plastic articles simultaneously. For example, embodiments may include one, two, three, four, or more than four sets of nozzle assemblies, gates, and cavities.

System 10 may include a co-injection control device 400 that controls various aspects of the system. Specifically co-injection control device 220 may provide instructions in the form of signals that cause each flow initiation device (19a-19a) to initiate or cease flow of the skin material, the core material or both into a corresponding cavity (22a-22d). Additional functions of the co-injection control device 400 are described below with respect to FIG. 20.

Figure 4:
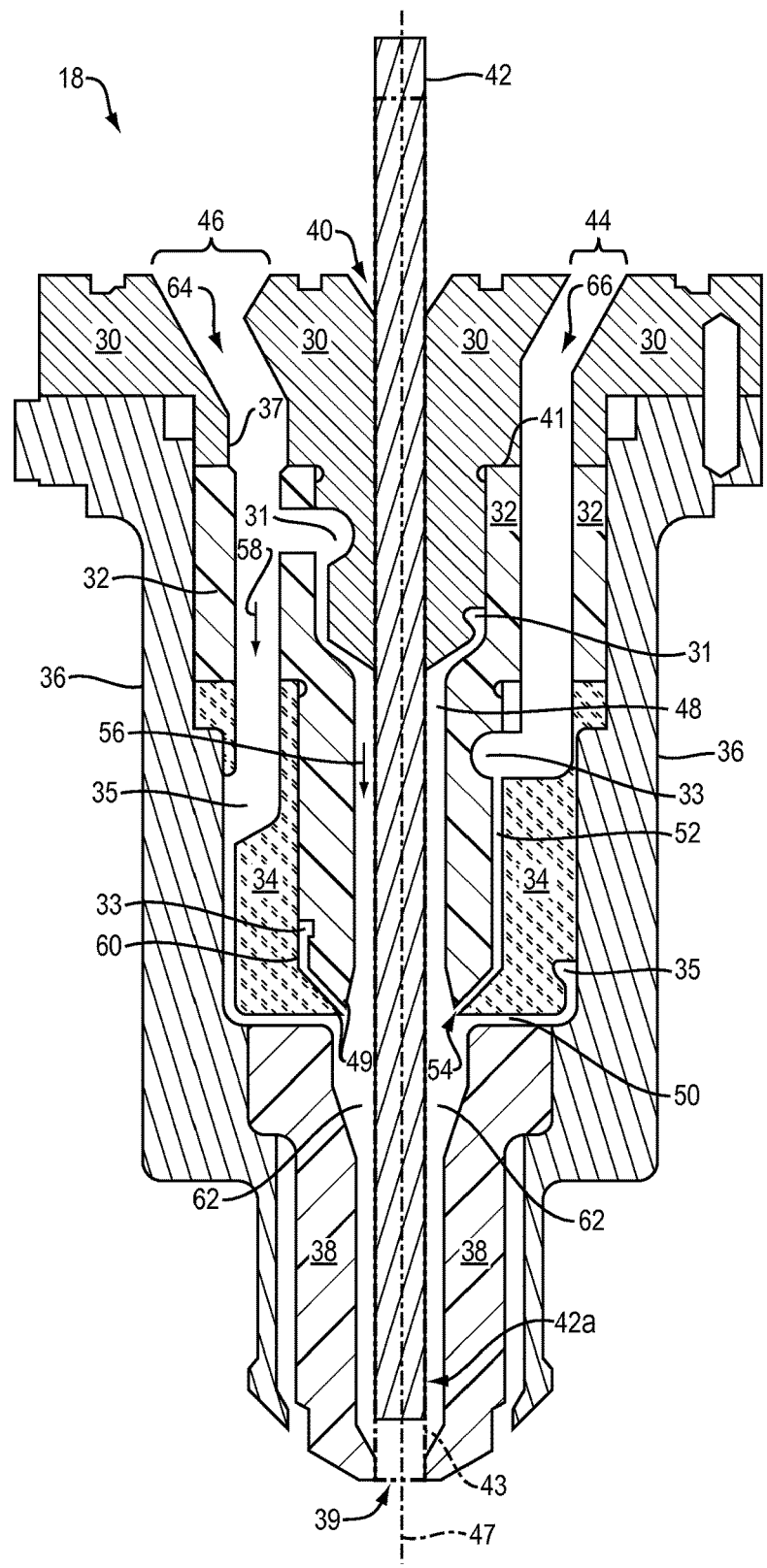
FIG. 4 schematically depicts an exemplary nozzle assembly suitable for practicing some embodiments taught herein.

FIG. 4 illustrates an exemplary nozzle assembly suitable for practicing some embodiments taught herein. Nozzle assembly 18 includes an inner combining means 30, a middle combining means 32, and an outer combining means 34. Nozzle assembly 18 further includes nozzle body 36 and nozzle tip 38. Inner combining means 30, middle combining means 32, outer combining means 34, nozzle body 36, and nozzle tip 38 cooperatively combine to form a number of conical, annular, and axial passages and channels in nozzle assembly 18. The nozzle assembly 18 is well suited for use in a co-injecting system, for example system 10, for forming a plastic object having two or more layers.

Inner combining means 30 includes a first inlet 46 to receive a first material 64, such as a skin material (i.e., inner and outer layer material), and a second inlet 44 to receive a second material 66, such as a core material (i.e., interior layer material). The inner combining means 30 further includes a through bore 40 configured to receive a valve pin 42. The through bore 40 extends through the middle combining means 32, and through a portion of the outer combining means 34 to allow the valve pin 42 to move in an axial direction along a longitudinal axis 47 of the nozzle assembly 18. Through bore 40 has an inner wall diameter that varies along the central longitudinal axis 47 of the nozzle assembly 18.

Valve pin 42 is movable in an axial direction along the central longitudinal axis 47 of nozzle assembly 18 to assist in controlling the flow of the first polymeric material 64 and second polymeric material 66 through nozzle assembly 18 and into mold 24. For example, before injection, the valve pin 42 is in a position indicated by the dotted line 43 with a distal portion of the valve pin 42a blocking the output portion 39 of the nozzle. When flow of the first material 63 is initiated, a pressure of the first material increases in the first flow channel 13 of the manifold (see FIG. 3) and the valve pin 42 is retracted to the position shown in FIG. 4, allowing material in the nozzle 18, which is initially only the first material, to flow out through the output portion 39. In some embodiments, the system is configured for the valve pin to move between the fully blocking (no flow) position to the fully retracted (open flow) position without holding a position in between. In this embodiment, the valve pin behaves like an on/off switch for permitting flow of materials out of the nozzle. In some embodiments, the system is configured to move the valve pin to one or more intermediate positions between the retracted (open flow) position and the fully blocking (no flow) position. In the nozzle 18 of FIG. 4, valve pin 42 is the flow initiation element, in accordance with some embodiments.

Middle combining means 32 cooperatively engages with the inner combining means 30 to form a portion of the plurality of annular flow channels in nozzle assembly 18. Middle combining means 32 receives the first material 64 from channel 37 and receives the second material 66 from channel 41 and manipulates the flow of each of the polymeric materials through a plurality of annular fluid carrying passages or channels. The flow manipulation carried out by middle combining means 32 initiates the creation of an outer material stream 58 and an inner material stream 56 that together encapsulate an interior material stream 60.

The middle combining means 32 when coupled with the inner combining means 30 forms a wrapped-coat-hanger die 31 that circumferentially extends around the through bore 40 and valve pin 42. Wrapped-coat-hanger die 31 provides annular fluid flow passage 48 with a uniform melt distribution of the first polymeric material 64. The annular fluid flow passage 48 channels an annular flow stream of the inner material stream 56 into stream combination area 54 through an orifice.

Outer combining means 34 cooperatively engages with middle combining means 32 to form one or more fluid carrying passages or channels to manipulate the second polymeric material 66 forming an interior layer of the resulting plastic object. The outer combining means 34 when coupled with the middle combining means 32 forms a wrapped-coat-hanger die 33 that circumferentially extends around inner material stream 56, through bore 40, and valve pin 42. Wrapped-coat-hanger die 33 provides conical fluid flow passage 52 with a uniform melt distribution of the second polymeric material 66. Conical flow passage 52 feeds an annular stream of the second polymeric material 66 into stream combination area 54 through another orifice.

The outer combining means 34 cooperatively engages with nozzle body 36. The outer combining means 34 when coupled with the nozzle body 36 forms wrapped-coat-hanger die 35 that circumferentially extends around the interior layer stream 52, the inner layer stream 56, the through bore 40, and the valve pin 42. Wrapped-coat-hanger die 35 provides radial fluid flow passage 50 with a uniform melt distribution of the first polymeric material 64. Radial fluid flow passage 50 feeds stream combination area 54 with a flow of first polymeric material 64 through an orifice. The first polymeric material 64 fed into the stream combination area 54 through the orifice forms the outer layer of a resulting molded object.

Fluid flow passages 48, 50, and 52 feed stream combination area 54 with the outer material stream 58, the inner material stream 56, and the interior material stream 60. A portion of the nozzle tip 38, a portion of the outer combining means 34, a portion of the middle combining means 32, and a portion of the valve pin 42, in combination form the stream combination area 54. Stream combination area 54 combines in a simultaneous or near simultaneous manner the outer material stream 58 received from the fluid flow passage 50, the inner material stream 56 received from the fluid flow passage 48, and the interior material stream 60 received from the fluid flow passage 52 to form annular output stream.

The channels, bores and passageways of the inner combining means 30, the middle combining means 32 and the outer combining means 34 and more specifically the channels, bores and passageways associated with the formation and the flow of inner and outer layer material in the nozzle assembly 18 may be sized, defined, adapted and configured to control or produce a desired volumetric flow ratio as discussed above. In this manner, after initiation of combined flow, the valve pin 42 may remain in a fixed retracted (open flow) position and does not need to be moved to control or form a particular volumetric flow ratio during injection. Movement of the valve pin for timing of initiation of flow of the first material is controlled by the co-injection control device individually for each cavity, in some embodiments. However, the nozzle assembly 18 has a channel configuration and structure to output a desired or selected volumetric flow ratio without the need of an associated controller or microprocessor for adjusting a position of the valve pin during co-injection. In some embodiments, the valve pin 42 may be controlled by a controller or microprocessor to control the volumetric flow ratio by moving the valve pin to intermediate positions between a closed (no flow) position and a retracted (open flow) position.

The annular output stream 49 flows from the stream combination area 54 through fluid flow passage 62 to output portion 39 of nozzle assembly 18. Fluid flow passage 62 has an annular inner passage that radially extends about through bore 40 and axially extends from the stream combination area 54 to the output portion 39. The output portion 39 communicates with a gate of a mold, such as one of gates 20a-20d.

The annular output stream 49 formed by the stream combination area 54 has an outer annular skin layer and an inner annular skin layer formed of the first polymeric material 64, and an interior or core annular layer formed of the second polymeric material 66. The inner and outer skin layers of the first polymeric material 64 each have a substantially similar cross-sectional area as the materials flow through the fluid flow passage 62 to the output portion 39. The inner and outer skin layers of the first polymeric material 64 encapsulate the interior layer of the second polymeric material 66, which forms a core portion of a resulting plastic object. Upon injection from the nozzle assembly 18, the combined polymeric stream 49, includes an interior stream that flows along concentric or annular streamlines between the inner and outer polymeric streams.

Another example of a nozzle assembly, also referred to herein as a nozzle, suitable for practicing some embodiments is described below with respect to FIG. 11. Nozzle 218 shown in FIG. 11 includes a valve pin with a distal portion having a larger diameter than that of a mid-portion of the valve pin. Nozzle 218 of FIG. 11 also includes middle combining means structure that extends toward the valve pin.

Figure 5:
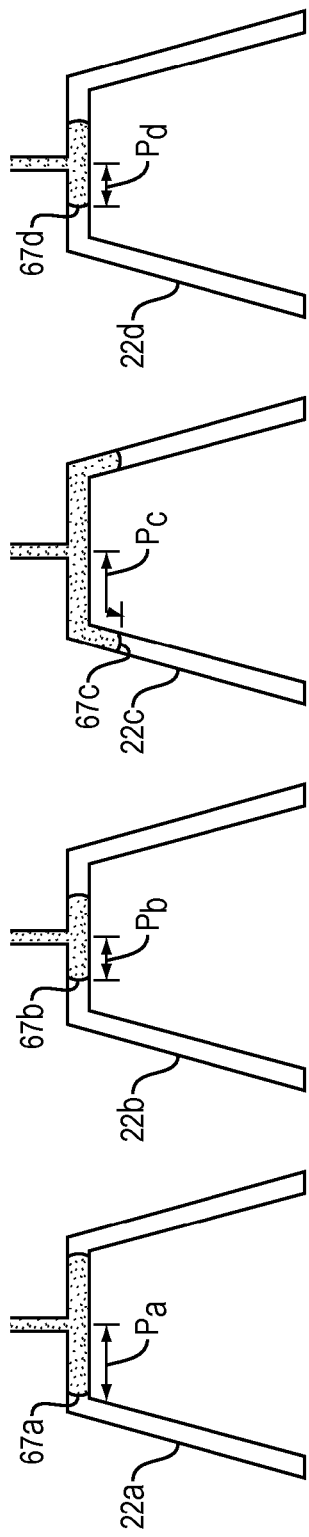
FIG. 5 is a schematic cross-sectional view of the plurality of cavities immediately before initiation of co-injection of a second material.
Figure 6:
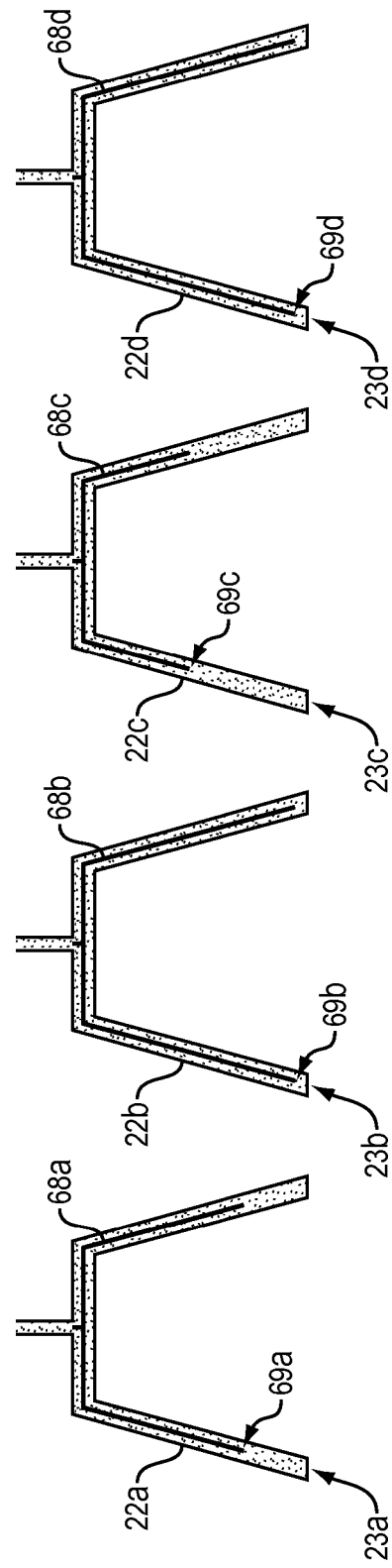
FIG. 6 is a schematic cross-sectional view of the plurality of cavities upon completion of injection showing coverage of a core layer varying from cavity to cavity.

FIGS. 5 and 6 graphically illustrate cavities during and after an injection that results in uneven core layer coverage of articles from different cavities. In FIGS. 5 and 6, injection of the first material (e.g., the skin material) is initiated by the controller simultaneously for each cavity and delivery of the second material to the nozzles is initiated by the controller simultaneously for each cavity, meaning that the specified skin-core delay is the same for each cavity. For example, the controller may increase the pressure of the first material in the first material channel and instruct the valve pin for each cavity to open simultaneously permitting flow of the first material into the cavities. Due to practical variables described above, even if the controller initiates flow of the first material into the cavities simultaneously, the flow may not begin simultaneously in the various cavities and the flow rate may vary from cavity to cavity. As another example, the controller may initiate co-injection of the second material into the cavities simultaneously by increasing the pressure of the second material in the second material channel 15. Due to the practical variables described above, even in a well-designed system the second material flow may not begin simultaneously in the various cavities and the flow rate may vary from cavity to cavity. Although different cavities have the same specified skin-core delay in terms of instructions from the controller, non-uniform flow rates from cavity to cavity and other variables may result in different positions of the leading edge of the second core material in articles produced in different cavities.

FIG. 5 schematically depicts a leading edge 67a-67d of the first material flow in each cavity 22a-22d immediately before co-injection of the second material. A flow path distance from the gate to the leading edge of the first material flow immediately before co-injection of the second material is illustrated as $P_a$-$P_d$. As shown in FIG. 5, the leading edge 67a in cavity 22a and the leading edge 67c in cavity 22c are further advanced than the leading edge 67b in cavity 22b and the leading edge 67d in cavity 67d, meaning that the flow path distances from the gate to the lead edge of the first material flow for cavity 22a and cavity 22c ($P_a$ and $P_c$ respectively), are greater than the flow path distances from the gate to the leading edge for cavity 22b and cavity 22d ($P_b$ and $P_d$ respectively). This means that the first material has flowed further and has a large "head start" on the second material in cavities 22a and 22c, than in cavities 22b and 22d.

FIG. 6 schematically depicts the cavities 22a-22d after completion of injection. Because the leading edge of the first material 67a, 67c had a larger "head start" in cavities 22a and 22c, the stream of the second material into cavities 22a and 22c did not substantially catch up to the leading edge of the first material during the injection process. As shown in FIG. 6, cavities 22a and 22c have a core layer 68a, 68c of a second material whose leading edge 69a, 69c does not extend to a distal end 23a, 23c of the cavity, resulting in corresponding articles with significant portions lacking a core layer. In contrast, in cavities 22b and 22d, the stream of the second material caught up with, or nearly caught up with, the leading edge of the first material, resulting in the articles in cavity 22b and cavity 22d each having a core layer 68b, 68d that extends to or near a distal end 23b, 23d of the cavity. Cavities 22b, 22d each produce a corresponding article with a core layer extending to or near the distal end of the resulting article.

In some embodiments, after an injection cycle is performed resulting in articles from different cavities having different positions for a leading edge (e.g., see FIG. 6), in a subsequent injection cycle, at least one cavity is assigned a different specified skin-core delay than another of the cavities. As explained above, the skin-core delay for a cavity is the delay specified in the controller for injection of the skin material into the cavity relative to co-injection of the core material into the cavity.

For example, after the injection cycle depicted in FIG. 6, in a subsequent cycle smaller specified skin-core delays may be used for cavities 22a and 22c. In some embodiments, initiation of flow of the first material into cavity 22a and cavity 22c may occur later than initiation of flow of the first material into cavity 22b and cavity 22d, resulting in smaller specified skin-core delays for cavities 22a and 22c. The specified skin-core delay for cavity 22c may be smaller than the specified skin-core delay for cavity 22a due to the greater "head start" exhibited by cavity 22c in the previous injection cycle. By reducing the specified skin-core delay for cavities 22a and 22c, the "head start" given to the first material stream relative to the second material stream would be reduced or eliminated, resulting in a more uniform core layer leading edge position across the cavities.

In some embodiments, control of the delay in initiation of flow of the first material into one or more cavities relative to other cavities may be accomplished through the use of flow initiation elements associated with nozzles (e.g., valve pins 19a-19d). For example, by individually controlling the timing of retracting the valve pin associated with a cavity relative to the timing of increasing pressure of the second material in the second material channels, different cavities can have different specified skin-core delays. This may be referred to as fill sequencing or sequential fill gating.

Figure 7:
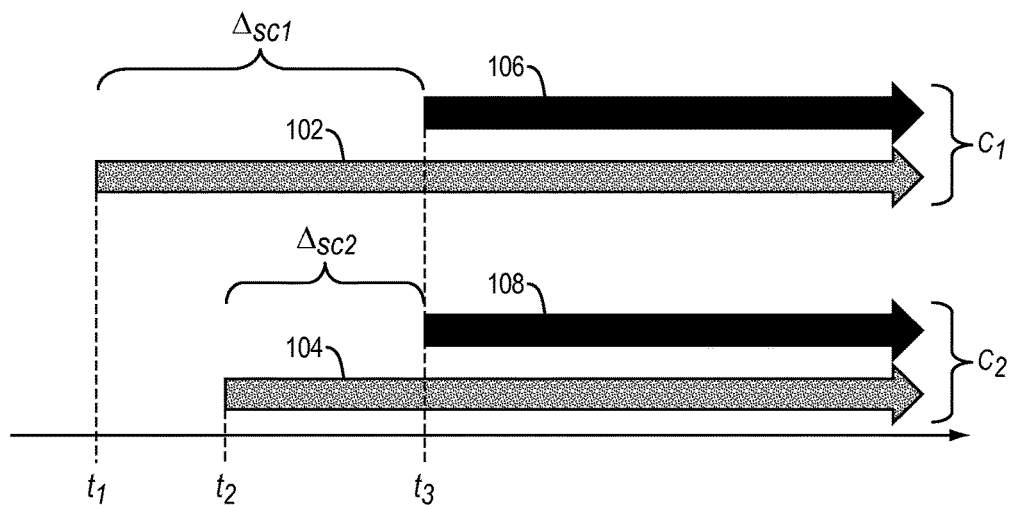
FIG. 7 includes schematic timelines of a method, in accordance with some embodiments.
Figure 8:
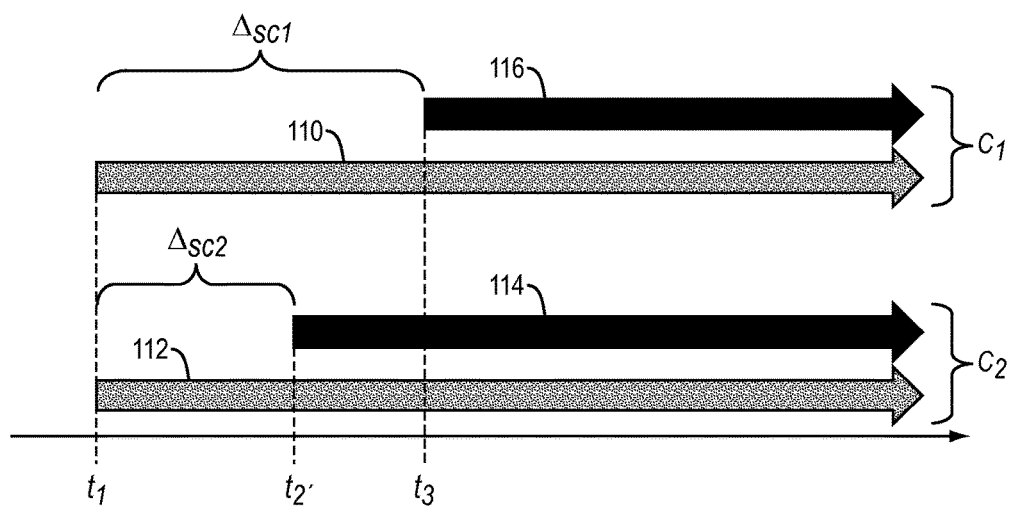
FIG. 8 includes schematic timelines of another method, in accordance with some embodiments.
Figure 9:
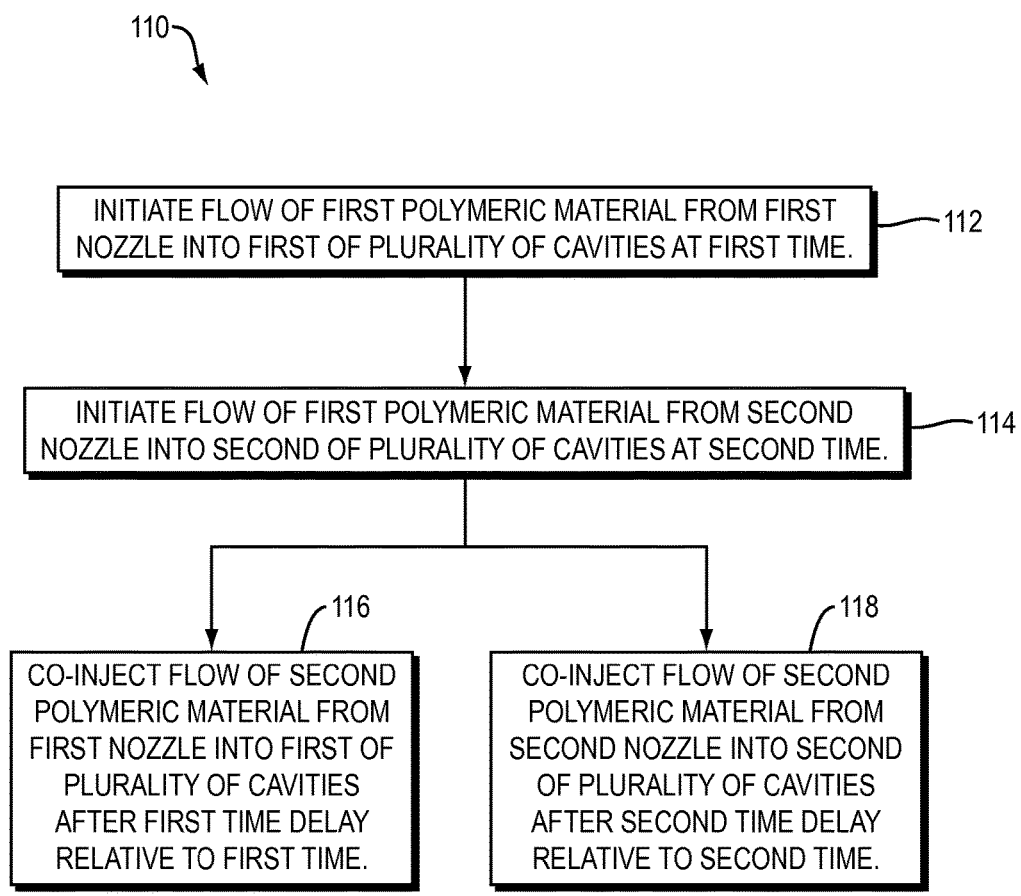
FIG. 9 is a flow chart for forming a multi-layer article corresponding to the method of FIG. 5.
Figure 10:
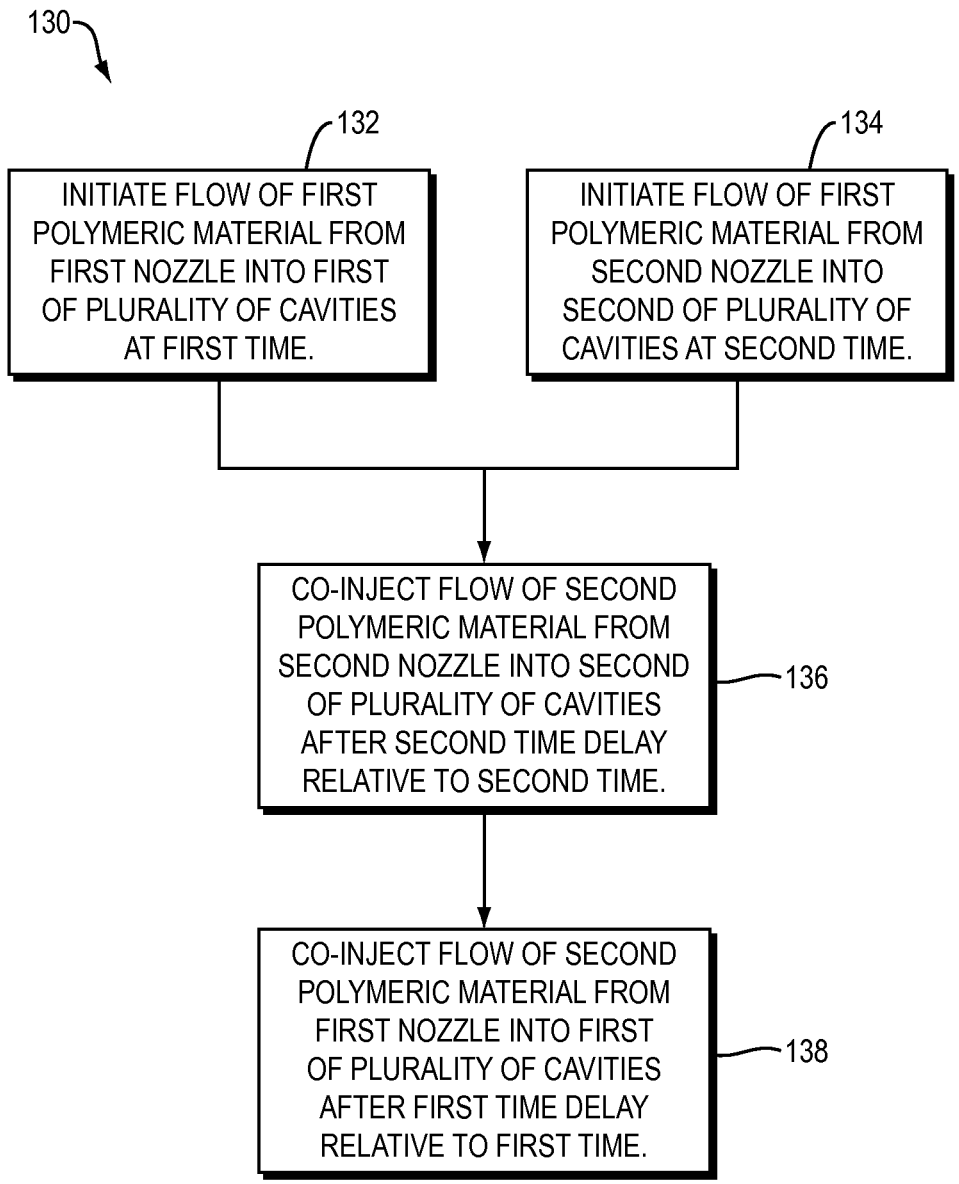
FIG. 10 is a flow chart for forming a multi-layer article corresponding to the method of FIG. 6.

An embodiment is a method of co-injecting molding a plurality of multi-layer articles using a corresponding plurality of cavities (e.g., cavities 22a-22d). Timelines for different embodiments of the method are illustrated in FIGS. 7 and 8. FIG. 9 is a flow diagram of an embodiment of the method corresponding to the timeline of FIG. 7. FIG. 10 is a flow diagram of an embodiment of the method corresponding to the timeline of FIG. 8.

In method 110 of FIG. 9, a flow of a first polymeric material from a first nozzle into a first of the plurality of cavities is initiated at a first time (step 112). For example, in FIG. 7, the upper portion of the timeline ($C_1$) corresponding to the first cavity shows initiation of the flow of the first polymeric material from the first nozzle into the first cavity at the first time $t_1$, as depicted with dotted arrow 102.

In method 110, a flow of the first polymeric material from a second nozzle into a second of the plurality of cavities is initiated at a second time (step 114). For example, in FIG. 7, the lower portion ($C_2$) of the timeline corresponding to the second cavity shows initiation of the flow of the first polymeric material from the second nozzle into the second cavity at the second time $t_2$, as depicted with dotted arrow 104. As shown, the second time $t_2$ may be later than the first time $t_1$.

Initiation of flow of the first material into a cavity may be due to an increase in the pressure of the first material supplied to a nozzle for the cavity, may be due to a change in the position of the valve pin in the nozzle, or may be due to both. In some embodiments, a pressure of the first material supplied to a first nozzle supplying first cavity and in a pressure of the first material supplied to a second nozzle supplying the second cavity are both increased before or at time $t_1$, and the delay in initiation of flow of the first material into the second cavity is due the valve pin for the second nozzle moving to an open position later than the valve pin of the first nozzle moving to an open position. In some embodiments, a pressure of the first material supplied to the first nozzle is increased before or at time $t_1$ and the pressure of the first material supplied to the second nozzle is increased at time $t_2$ such that the timing of an increase in pressure of the first material supplied to the nozzles at least partially accounts for the delay in initiation of flow into the second cavity. In embodiments having a delayed pressure increase of the first material for some nozzles, the valve pin position may also be used in control timing of initiation of the first material flow into various cavities.

The method 110 also includes co-injection of a second polymeric material into the first of the plurality of cavities after a first time delay relative to the first time (step 116). For example, in FIG. 7, co-injection of the second polymeric material into the first cavity (depicted with solid arrow 106) occurs after a first time delay $\Delta_{sc1}$ relative to the first time $t_1$, which may be referred to as a first skin-core time delay or the skin-core time delay for the first cavity.

The method 110 further includes co-injection of the second polymeric material into the second of the plurality of cavities after a second time delay relative to the second time, where the second time delay is different than the first time delay (step 118). For example, in FIG. 7, co-injection of the second polymeric material into the second cavity (depicted with solid arrow 108) occurs at a second delay time $\Delta_{sc2}$ after injection of the first polymeric material into the second cavity relative to the second time $t_2$, which may be referred to as a second skin-core time delay or the skin-core time deal for the second cavity. As illustrated by FIG. 7, in some embodiments, the co-injection of the second material into the first cavity and co-injection of the second material into the second cavity may be initiated at the same time (e.g., $t_3$); however, the skin-core time delay is larger for the first cavity ($\Delta_{sc1}$) than for the second cavity ($\Delta_{sc2}$)

In some embodiments, a flow initiation element (e.g., a valve pin) of each nozzle may individually control a skin-core time delay for each cavity. For example, in FIGS. 7 and 9, the controller may increase the pressure of the first material in the first material channel and retract a valve pin of the first nozzle associated with the first cavity at time $t_1$ to initiate flow of the first material in the first cavity. The controller may later retract a valve pin of the second nozzle associated with the second cavity at time $t_2$ to initiate flow of the first material into the second cavity. Co-injection of the second material from the first nozzle into the first cavity and from the second nozzle into the second cavity at $t_3$ may be initiated simultaneously by increasing a pressure of the second material in the second material channel at time $t_3$.

FIG. 8 shows a timeline corresponding to a different embodiment of a method. FIG. 10 is a flow diagram corresponding to the embodiment of method 130 shown in FIG. 8. In the embodiment of FIGS. 8 and 10, initiation of a flow of the first polymeric material from the first nozzle into the first cavity (step 132), which is represented by dotted arrow 110 in FIG. 8, and initiation of a flow of the first polymeric material from the second nozzle into the second cavity (step 13), which is represented by dotted arrow 112, occur simultaneously at $t_1$. Co-injection of the second polymeric material from the second nozzle into the second of the plurality of cavities (step 136 of FIG. 10), which is represented by solid arrow 114 in FIG. 8, is initiated at time $t_{2'}$ after a skin-core time delay $\Delta_{sc2}$. Co-injection of the second polymeric material from the first nozzle into the first of the plurality of cavities (step 138 of FIG. 10), which is represented by solid arrow 116 in FIG. 8, is initiated at time $t_3$ after a skin-core time delay $\Delta_{sc1}$. Thus, in the embodiment depicted in FIG. 8, initiation of co-injection of the second polymeric material into the first cavity (at time $t_3$) occurs after initiation of co-injection of the second polymeric material into the second cavity (at time $t_{2'}$). Delay of injection of the second polymeric material in one or more cavities relative to injection of the second polymer material into other cavities may be accomplished mechanically (e.g., with a valve pin, valve pin sleeve). For example, see the description of FIGS. 20-23 below.

In other embodiments, initiation of injection of the first material into first cavity and initiation of injection of the first material into the second cavity may occur at different times, and initiation of co-injection of the second material into the first cavity and initiation of co-injection of the second material into the second cavity may also occur at different time.

In some embodiments, a difference in the skin-core delay among the cavities in a mold may fall in the range of about 5% to about 55%, may fall in the range of about 15% to about 45%, or may fall in a range of about 25% to about 35% of the total injection period. For example, in some embodiments, a difference in the skin-core delay among the cavities in a mold may be about 30%, which would be a delay of about 0.3 seconds for a typical total injection period of 1 second.

A specified skin-core delay for each cavity may be determined based on core coverage of one or more articles previously produced using the cavity. If an injection system generally has good shot-to-shot repeatability, many injection cycles may be performed with the determined specified skin-core delays before requiring adjustment of the specified skin-core delays. In some embodiments, the specified skin-core delays may be adjusted every 1000 to 10,000 cycles, may be adjusted every 2,000 to 8,000 cycles, or may be adjusted every 5,000 to 7,000 cycles (e.g., every 6,000 cycles). In some embodiments, the specified skin-core delays may be adjusted based on a time period of use, such as every 6 to 24 hours, every 8 to 18 hours, or every 10 to 14 hours (e.g., every 12 hours).

In embodiments that employ a flow initiation element (e.g., a valve pin), or a flow control element (e.g., a valve pin) for each nozzle or for each cavity, actuation of the element may be performed using any known method, system or device. For example, actuation may be mechanical, pneumatic, hydraulic, and/or electromechanical. Actuation may involve piezoelectric elements, electrical motors, servo motors, pistons, etc.

In some embodiments, a sensor or sensors may be used to monitor a position of, or state of, a flow initiation element or a flow control element (e.g., a valve pin) for each nozzle or for each cavity. For example, each nozzle may include a position sensor that senses a position of the valve pin of the nozzle. The position sensor may send a signal including information regarding the position of the sensor to the co-injection control device 400. The position sensor may be an electromagnetic sensor, a magnetic sensor, a piezoelectric sensor, an optical sensor and/or may be any other suitable type of sensor or combination of sensors.

In some embodiments, a sensor or sensors may be used to monitor a condition of the first material and/or of the second material in the flow path of the materials upstream of the nozzles, within the nozzles, and/or downstream of the nozzles. For example, a sensor or sensors may detect a temperature and/or a pressure of the first material in the first flow path 13, in each nozzle 18 or downstream of each nozzle. A sensor or sensors may detect a temperature and/or a pressure of the second material in the second flow path 15, or in each nozzle 18. A sensor or sensors may detect a temperature and/or a pressure of the co-injection stream of the first material and the second material downstream of each nozzle.

In some embodiments, the co-injection controller may include a monitoring system that monitors core layer coverage in articles produced in each cavity to automatically adjust the specified skin-core delay for each cavity. For example, U.S. Pat. No. 7,517,480, filed Aug. 18, 2004, the contents of which is incorporated herein in its entirety, describes an automatic process control system including an inspection device for measuring a selected product feature (e.g., position of the leading edge of the core layer) and a control system for that automatically alters an injection apparatus, a nozzle temperature, or both in response to the measured product feature. Suitable measurement techniques for the inspection device include, but are not limited to: optical techniques, ultrasound techniques, magnetic resonance techniques and gas pressurization techniques. Although U.S. Pat. No. 7,517,480 uses control of nozzle temperature to influence leading edge core layer position, the detection and automation system could be used to individually control valve pin position and/or individually control flow initiation for various cavities.

In some exemplary systems and methods, for each of a plurality of cavities in a mold, a flow rate of material out of a corresponding nozzle into the cavity is individually controlled by the nozzle. In some embodiments, individual control of a flow rate of a first material into a cavity before co-injection of a second material into the cavity may address or at least partially address problems of non-uniform leading edge positions of a core layer in resulting articles from cavity to cavity in a mold. Each nozzle may include a flow rate control element for at least partially controlling a flow rate of material out of nozzle and in to a corresponding cavity. For example, after the injection cycle described above with respect to FIGS. 5 and 6, in which articles from cavities 22a and 22c have interior layers that do not extend to the distal ends 23a, 23c of the cavities, in a current injection cycle, a flow rate of a first material into cavity 22a and a flow rate of a first material into cavity 22c may be reduced before co-injection of the second material to reduce a "head start" of the first material in the cavity relative to the second material.

Figure 11:
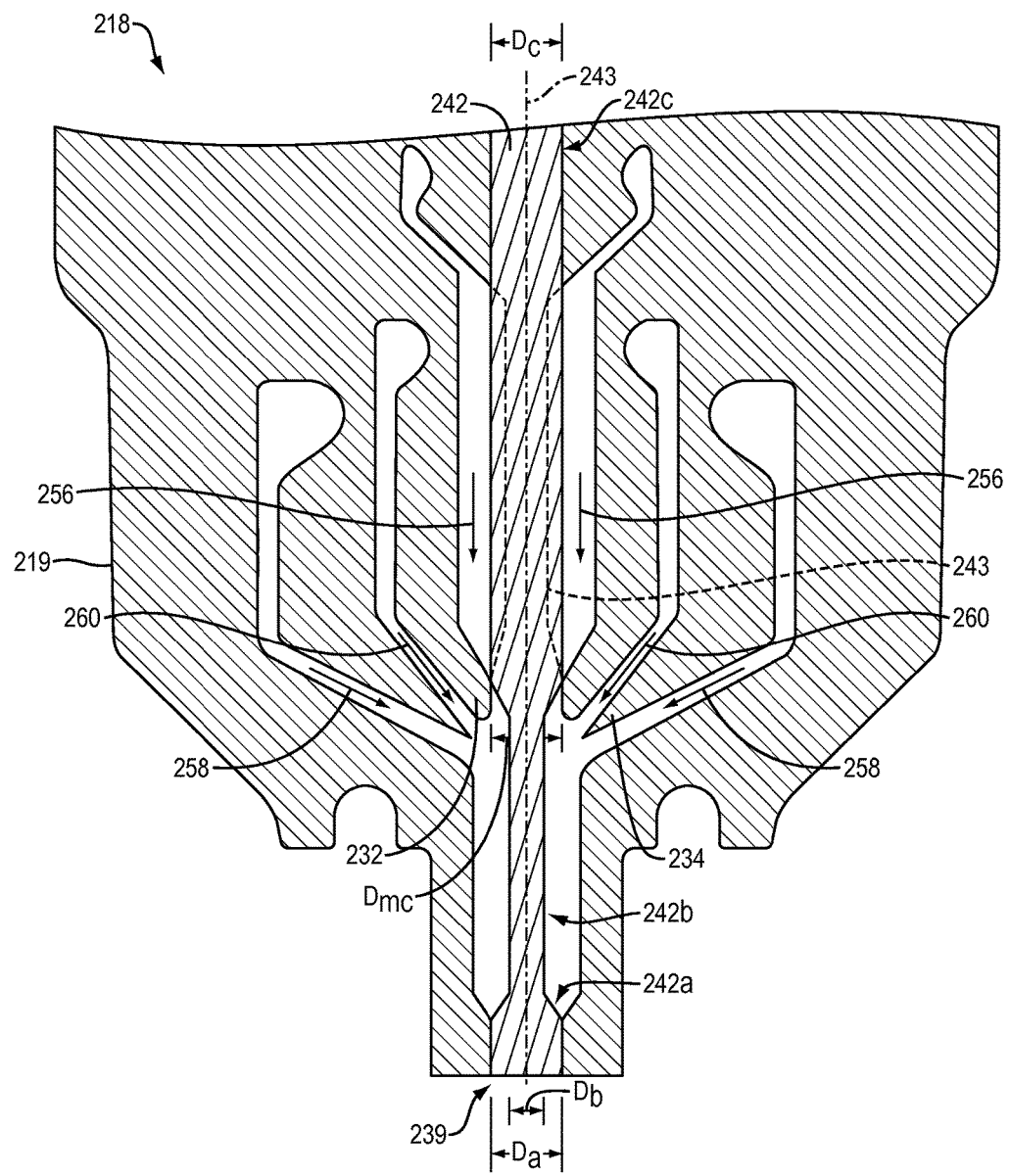
FIG. 11 schematically depicts an end portion of a nozzle including a valve pin with a proximal portion having a first diameter, a mid-portion having a second diameter and a distal portion having a third diameter, in accordance with some embodiments.

FIG. 11 schematically depicts an end portion of a nozzle 218 including a flow rate control element for individually controlling a rate of flow of material from an output portion 239 of the nozzle. For simplicity, nozzle 218 is shown with nozzle body 219. One of ordinary skill in the art will recognize that nozzle body 219 may include many different parts or portions similar to those described above with respect to nozzle assembly 18 of FIG. 4.

In nozzle 218 of FIG. 11, the flow rate control element includes a valve pin 242 having a proximal portion 242a with a first diameter $D_a$, a mid-portion 242b with a second diameter $D_b$ smaller than the first diameter $D_a$, and a distal portion 242c with a third diameter $D_c$. As used herein, the proximal portion of the valve pin is proximal relative to the mold cavity and the distal portion of the valve pin is distal relative to the mold cavity. As shown valve pin 242 is positioned to block material flow out of the output portion 239 of the nozzle. In some embodiments, the flow rate control element is also a flow initiation element. In other embodiments, a flow rate control element and a flow initiation element may be separate elements.

FIG. 12 schematically depicts a cross-sectional view of a portion of nozzle 218 and a corresponding cavity 220 of a mold 224. Although mold 224 defines a plurality of cavities, only one cavity, which could be any of the plurality of cavities, is shown in FIGS. 12-17. In FIGS. 12-17 and throughout the application, a thickness of a sidewall of the cavity, thickness of the interior stream, the inner stream and the outer stream, and thicknesses of an interior layer, an inner layer and an outer layer are exaggerated for illustrative purposes. As shown in FIG. 12, at a time $t=t_0$ before initiation of injection of material into cavity 220, valve pin 242 is in a position $P_0$ to block material flow out of the nozzle 218a with the distal portion 242a of the valve pin blocking the output portion 239 of the nozzle. When the valve pin 242 is retracted to allow flow of material out of the nozzle, the position of the valve pin may at least partially determine the flow rate of material out of the nozzle. For example, FIG. 13 shows the nozzle 218 and cavity 220 at a time $t_3$ just before initiation of co-injection of the second material. In FIG. 14, the valve pin 242 is in a restricted flow position $P_1$ with all material leaving the nozzle forced through an annular gap $L_{G1}$ between the proximal portion 242a of the valve pin and the output portion 239 of the nozzle body. As shown in FIG. 13, at $t_3$, immediately before initiation of co-injection of the second material, the restricted flow position $P_1$ and corresponding low rate of flow of the first material resulted in the first material stream leading edge 267a being located at $L_1$.

In contrast, FIG. 14 shows a more advanced position $L_2$ of the leading edge 267a of the first material stream at time $t_3$, which would have occurred if the valve pin 242 was in a promoted flow position $P_2$ during injection of the first material stream. With the valve pin in promoted flow position $P_2$, there is a relatively long unrestricted distance $L_{u2}$ between the proximal portion 42a of the valve pin and the output portion 239 of the nozzle, as compared to the unrestricted distance $L_{u1}$ with the valve pin in restricted flow position $P_1$ (see FIG. 13), resulting in a higher rate of material flow out of the nozzle. The high rate of flow of the first material out of the nozzle with the valve pin in position $P_2$ before co-injection of the second material results in a relatively advanced position $L_2$ for the first material stream leading edge 267a at time $t_3$ as compared with the position $L_1$ of the leading edge that would result from the lower rate of flow of the first material out of the nozzle with the valve pin in restricted flow position $P_1$.

Although only one valve pin position is illustrated for restricted flow $P_1$ and only one valve pin position is illustrated for promoted flow $P_2$, one of skill in art would recognize that varying the valve pin position along valve pin axis 243 results in different degrees of promoted flow and different degrees of restricted flow thereby controlling a flow rate out of the nozzle.

Figure 15:
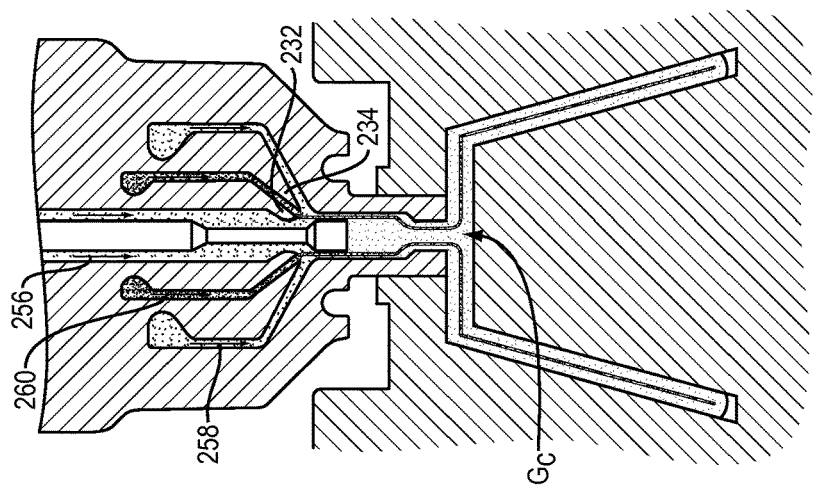
FIG. 15 schematically depicts the nozzle and corresponding cavity with the valve pin in the second partially retracted position for promoted flow of the first material and the co-injected second material.

FIG. 15 illustrates co-injection of the first material and the second material with the valve pin in the promoted flow position $P_2$. As noted above, co-injection of the second material may be initiated by increasing a pressure of the second material supplied to one or more of the nozzles. During co-injection, when the second material enters the nozzle and the valve pin 242 is partially retracted, an outer combining means 234 combines an outer stream 258 of the first material with an interior stream 260 of the second material, and a middle combining means 232 combines the interior stream 260 of the second material and an inner stream 256 of the first material (see also FIG. 11). After initiation of co-injection of the second material, whether the valve pin is in a restricted flow position or in a promoted flow position has less effect on final coverage of an interior layer because the position of the valve pin affects flow of both the first material and flow of the second material to about the same extent. As shown in FIG. 15, a gap $G_c$ in interior layer coverage exits in the cavity 220 near nozzle output portion 239 where the inner stream 256 flows in to form an inner surface layer of the resulting article.

The nozzle 218 and valve pin 242 may be configured such that fully retracting the valve pin 242 (as indicated by dotted lines 243 in FIG. 11) blocks a flow path of the inner stream 256 of the first material without blocking a flow path of the interior stream 260 of the second material and without blocking a flow path of the outer stream 258 of the first material. As shown in FIG. 11, the middle combining means 232 may extend inward toward the valve pin 242 forming a diameter $D_{mc}$. In some embodiments, the middle combining means diameter $D_{mc}$ may be about equal to the first diameter $D_a$ of the valve pin proximal portion 242a.

Figure 16:
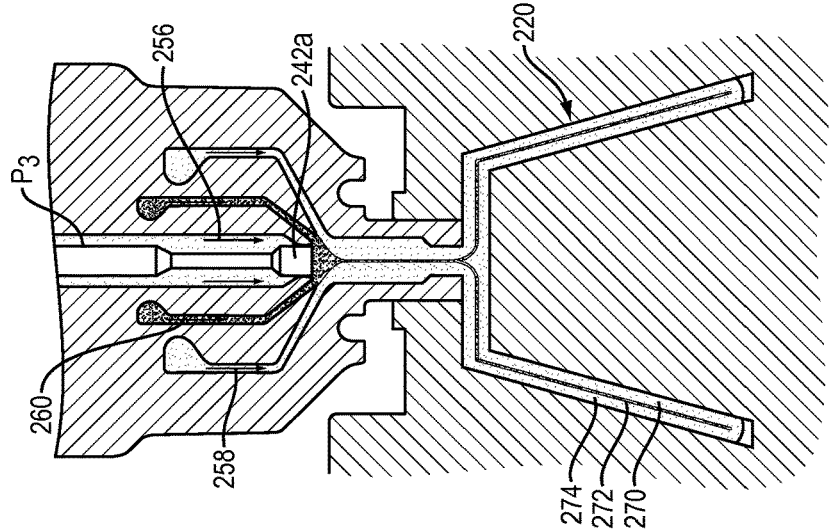
FIG. 16 schematically depicts the nozzle and corresponding cavity with the valve pin positioned to block flow of an inner stream of the first material while allowing flow of an interior stream of the second material and an outer stream of the first material.

As shown in FIG. 14, when the cavity 220 is almost full, the valve pin 242 is moved to a retracted two-layer flow position $P_3$ with the proximal portion 242a of the valve pin blocking the inner stream 256 of the first material while allowing the interior stream 260 of the second material and the outer stream 258 of the first material to flow into the cavity 220 as shown in FIG. 16. This results in the annular interior stream flow 260 (see FIG. 15) changing into a non-annular interior stream flow 261 (see FIG. 16), closing the gap $G_c$ in the interior layer 272.

Figure 17:
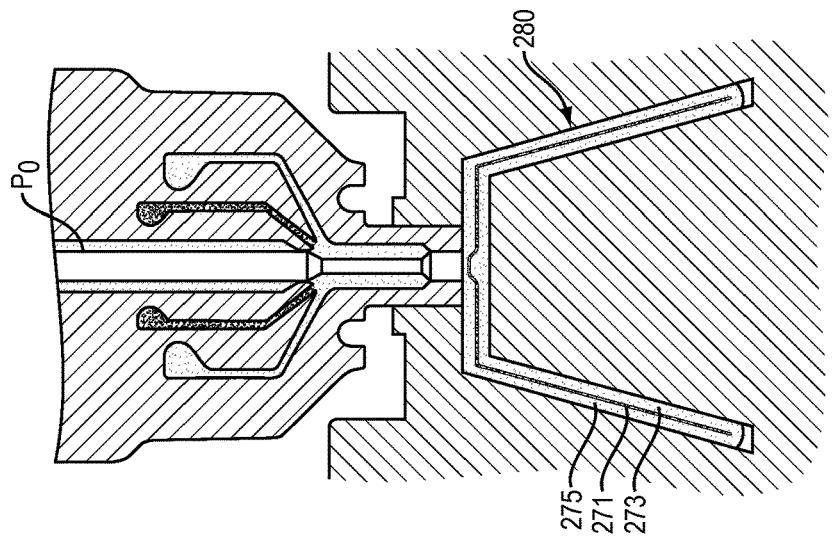
FIG. 17 schematically depicts the nozzle and corresponding cavity with the valve pin in a position blocking flow of material into the cavity after formation of the article including an inner layer of the first material, an outer layer of the first material, and an interior layer of the second material.

As shown in FIG. 17, after the cavity 220 is full and the interior layer 272 is fully formed, the valve pin 242 is moved to position $P_0$ to block further material flow into the cavity 220. The resulting article 280 has an interior layer 271 of the second material, an inner layer 273 of the first material and an outer layer 275 of the first material.

Figure 18:
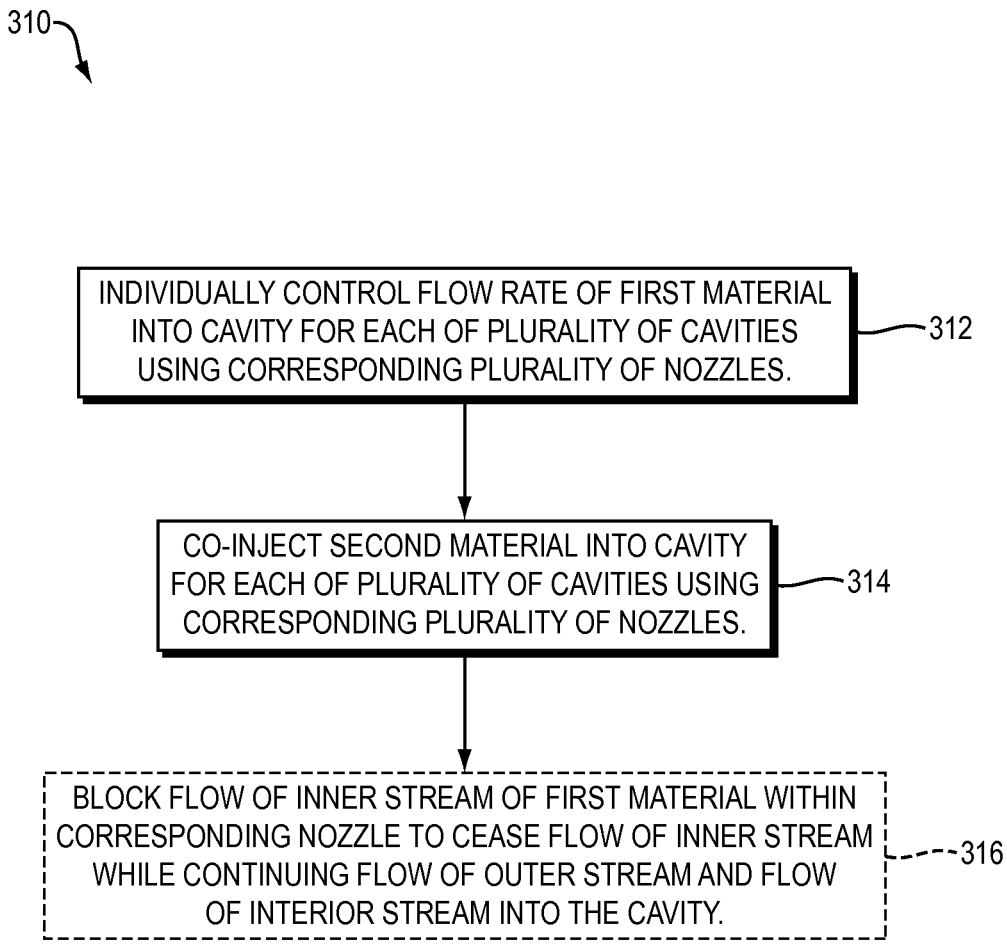
FIG. 18 is a flow chart depicting a method of forming a multi-layer article using co-injection and flow rate control for individual cavities, in accordance with some embodiments.

FIG. 18 schematically depicts a method 310 of co-injection molding a plurality of multi-layer articles using a corresponding plurality of cavities of a mold. For illustrative purposes, method 310 will be described below with respect to reference numbers in FIGS. 11-17. In method 310, for each mold cavity 220 in a plurality of mold cavities, a flow rate of a first material is controlled using a corresponding nozzle 218 of a plurality of nozzles (step 312). In some embodiments, the flow rate of a first material from a nozzle 218 may be controlled using a position of a valve pin 242 of the nozzle. For example, a nozzle 218 may have a valve pin 242 in a position $P_1$ restricting flow of the first material from the nozzle 218 into the corresponding cavity 220 resulting in a low flow rate (e.g., see FIG. 13). Another nozzle 218 may have a valve pin 242 in a position $P_2$ promoting flow of the first material from the nozzle 218 into the corresponding cavity 220 (e.g., see FIG. 14).

In some embodiments, a flow rate of the first material into a cavity may be determined by a position of a leading edge of an interior layer in an article previously produced by the cavity. For example, if a previous co-injection cycle produced articles from cavities 22a and 22c having a leading edge interior layer positions too far from the distal ends of the articles (e.g., see FIG. 6), nozzles corresponding to cavities 22a and 22c may have valve pin positions corresponding to restricted flows in a current injection cycle before co-injection of the second material. This would reduce the "head start" of the leading edge of the first material in cavities 22a and 22c relative to a leading edge of the co-injected second material.

For each cavity 220 in a plurality of cavities, a second material is co-injected into the cavity using the corresponding nozzle 218 thereby forming an interior layer 271 of the second material between an inner layer 273 of the first material and an outer layer 275 of the first material in the cavity 220 (step 314). In some embodiments, for each cavity 220, a total flow rate of material into the cavity 220 is controlled using the corresponding nozzle 218 after initiation of co-injection of the second material into the cavity 220.

In some embodiments, method 310 further includes blocking flow of the inner stream 270 of the first material within the corresponding nozzle to cease flow of the inner stream 270 while continuing flow of the outer stream 274 and flow of the interior stream 272 into the cavity (step 316) (see e.g., FIG. 16).

In some embodiments, method 310 further includes delaying initiation of flow of the first material into a first cavity of the plurality of cavities relative to initiation of flow of the first material into a second cavity of the plurality of cavities (e.g., see FIG. 7).

A time delay between initiation of flow of the first material into a cavity and initiation of co-injection of the second material into the cavity may be referred to as skin-core time delay for the cavity. In some embodiments, the method 310 further includes specifying a first skin-core time delay for a first cavity in the plurality of cavities and specifying a second skin-core time delay different than the first skin-core time delay for a second cavity in the plurality of cavities (e.g., see FIG. 8).

Figure 19:
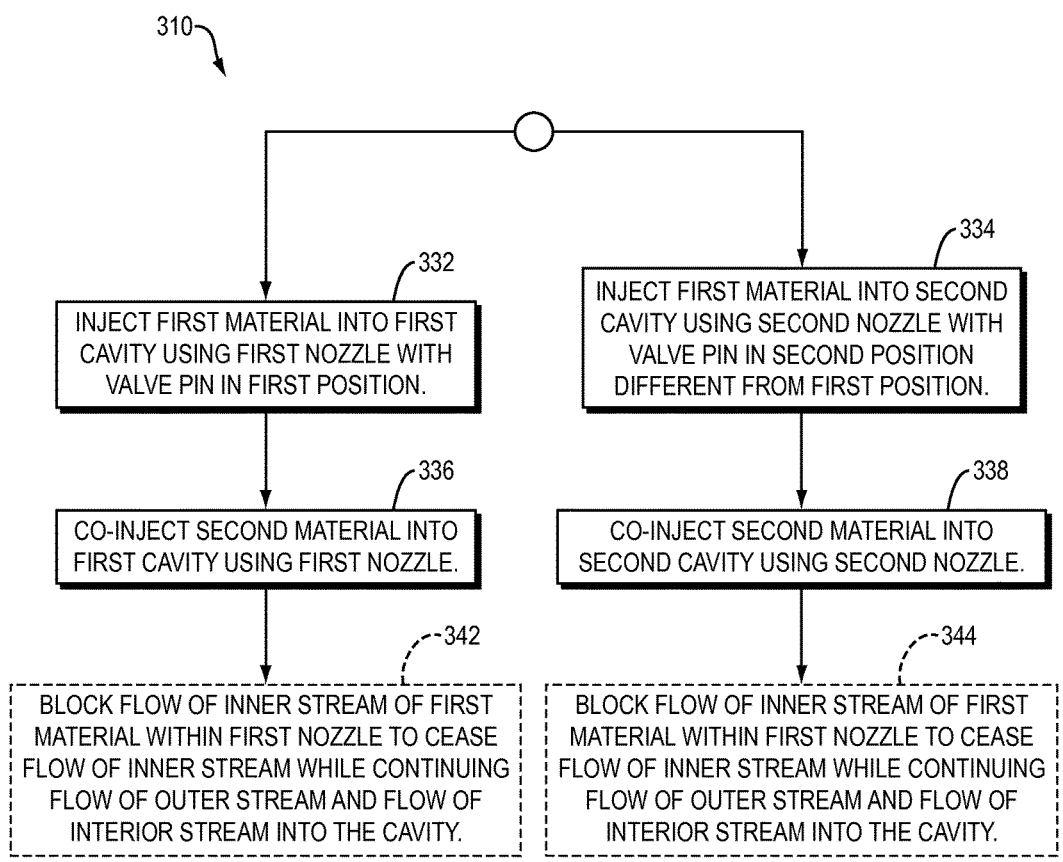
FIG. 19 is a flow chart depicting a method of co-injection forming a multi-layer article using individual cavity flow rate control, in accordance with some embodiments.

FIG. 19 schematically depicts a method 330 of co-injection molding a plurality of multi-layer articles using a corresponding plurality of cavities of a mold. For illustrative purposes, method 330 will be described below with respect to reference numbers in FIGS. 11-17. A first material is injected into a first cavity 220 of the plurality of cavities using a first nozzle 218 with a valve pin 242 of the first nozzle in a first position before co-injection of a second material in the first cavity 220 (step 332) (e.g., valve pin position $P_1$ shown in FIG. 13). A first material is injected into a second cavity 220 of the plurality of cavities using a second nozzle 218 with a valve pin 242 of the second nozzle in a second position different than the first position before co-injection of the second material into the second cavity 220 (step 334) (e.g., valve pin position $P_2$ shown in FIG. 14). For example, a nozzle 218 may have a valve pin 242 in a position $P_1$ restricting flow of the first material from the nozzle 218 into the corresponding cavity 220 at a relatively low flow rate (e.g., see FIG. 13). Another nozzle 218 may have a valve pin 242 in a position $P_2$ promoting flow of the first material from the nozzle 218 into the corresponding cavity 220 at a relatively high flow rate (e.g., see FIG. 14).

A second material is co-injected into the first cavity 220 using the first nozzle 218 thereby forming an internal layer 271 of a second material between an inner layer 273 of the first material and an outer layer 275 of the first material in the first cavity 220 (step 336) (e.g., see FIG. 14). The second material is co-injected into the second cavity 220 using the second nozzle 218 thereby forming an internal layer 271 of a second material between an inner layer of the first material 273 and an outer layer 275 of the first material in the second cavity 220 (step 338) (e.g., see FIG. 15).

A position of a valve pin 242 of the first nozzle 218 during injection of the first material into the first cavity 220 may be determined based on a position of a leading edge of an interior layer in an article previously produced in the first cavity and a position of a valve pin of the second nozzle during injection of the first material into the second cavity may be determined based on a position of a leading edge of an interior layer in an article previously produced in the second cavity 220. For example, if a previous co-injection cycle produced an article from cavity 22a having a leading edge interior layer position too far from a distal end of the article and produced an article from cavity 22b having a leading edge interior layer position close to a distal end of the article (e.g., see FIG. 6), a first nozzle for cavity 22a may have the valve pin in a position $P_1$ restricting flow of the first material from the first nozzle into the corresponding cavity 22a, and the second nozzle for cavity 22b may have the valve pin in a position $P_2$ promoting flow of the first material from second nozzle into the corresponding cavity 22b. This would reduce the "head start" of the leading edge of the first material relative to a leading edge of an interior layer of the second material in cavity 22a.

In some embodiments, method 330 further includes delaying initiation of flow of the first material into the first cavity relative to initiation of flow of the first material into the second cavity (e.g., see FIG. 7). In some embodiments, method 330 further includes specifying a first skin-core time delay for the first cavity and specifying a second skin-core time delay different than the first skin-core time delay for the second cavity (e.g., see FIG. 8).

In some embodiments, method 330 further includes blocking flow of the inner stream of the first material within the first nozzle to cease flow of the inner stream 270 while continuing flow of the outer stream 274 and flow of the interior stream 272 into first cavity (step 340) (see e.g., FIG. 16).

Although the description above refers to a first flow rate and a second flow rate, one of ordinary skill in the art will appreciate that a flow rate may vary over time. Thus, the term "flow rate" as used herein, may refer to a flow rate profile of the flow rate as a function of time over an injection cycle for a time-varying flow rate.

Figure 20:
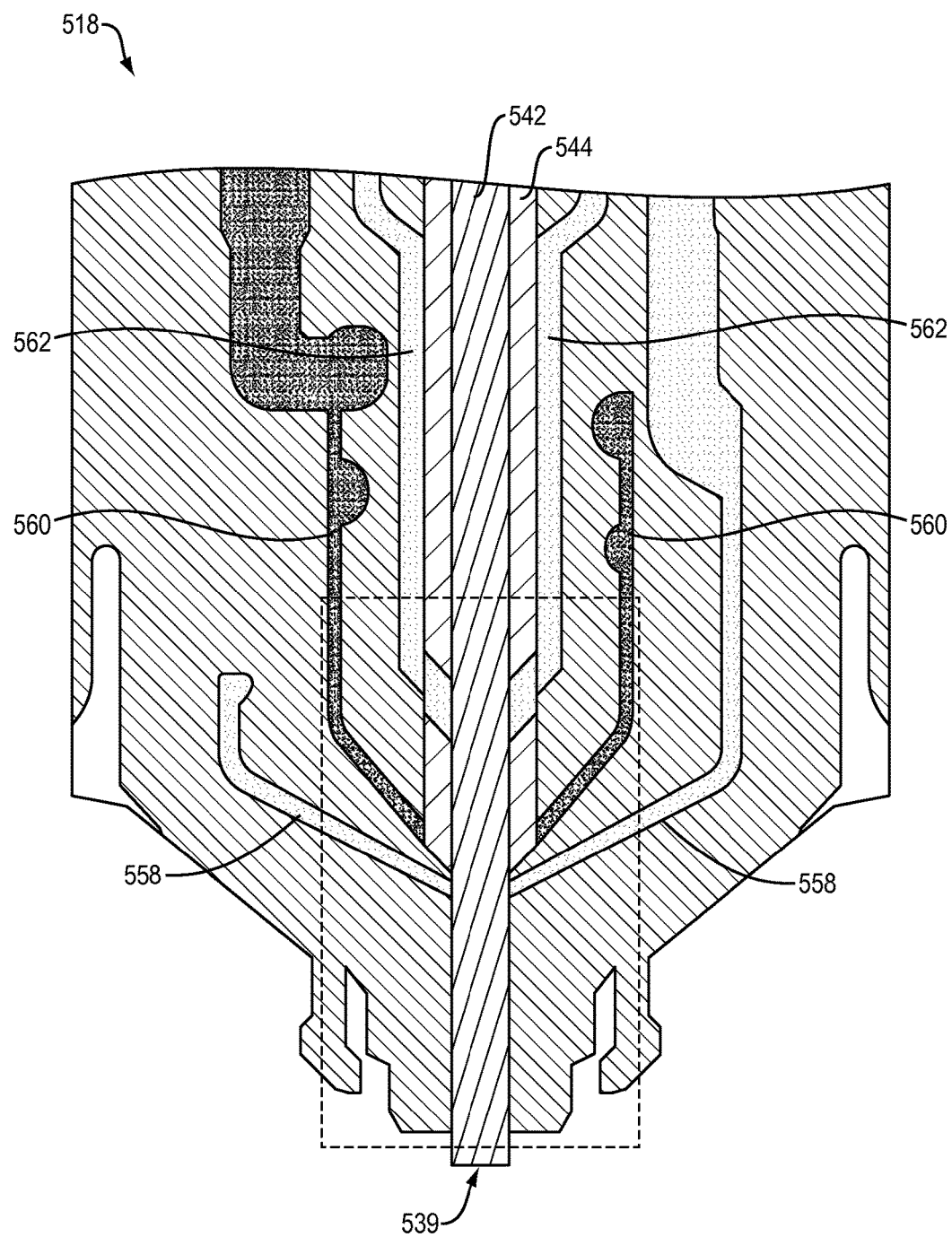
FIG. 20 schematically depicts a side cross-sectional view of a variation of a nozzle assembly configured for delaying flow of the second material, in accordance with some embodiments.

FIG. 20 schematically depicts a portion of a nozzle 518 including a mechanical flow initiation element that can delay injection of the second polymeric material into one or more cavities relative to injection of the second polymer material into other cavities. Nozzle 518 includes a valve pin core 542 and valve pin sleeve 544 encircling the valve pin core 542. The valve pin sleeve 544 functions as a mechanical flow initiation element for the second polymer material because it is configured to selectively block a flow path of an interior core stream 562 of the second material. As shown in FIG. 20, the valve pin core 542 is in a configuration to block flow of an outer stream 558 of the first material, to block flow of an interior stream 560 of the second material, to block flow of an inner stream 562 of the first material, and to block an output portion 539 of the nozzle. In FIG. 20, the valve pin sleeve 543 is in a configuration to block flow the interior stream 560 of the second material.

Figure 21:
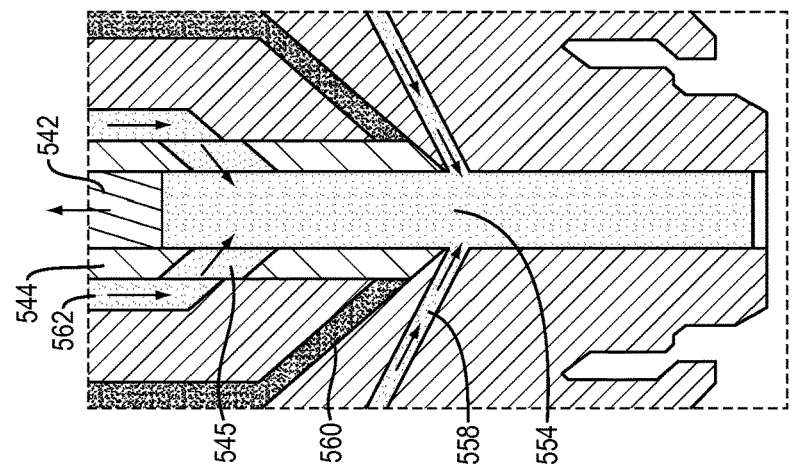
FIG. 21 is a detail of the nozzle assembly of FIG. 20 in a configuration for blocking a flow of the interior core stream of the second material while establishing a flow path for combining the outer stream of the first material and the inner stream of the first material.

In the detail of FIG. 21, the valve pin core 142 has been retracted to a position where it doesn't block the inner stream 562, the interior stream 560 or the outer stream 558. Apertures 545 in the valve pin sleeve 544 allow the inner stream 562 to flow through the valve pin sleeve 544. However, in this configuration the valve pin sleeve 144 still blocks flow of the interior stream 560. If the injection pressure of the second material is increased at the same time for all nozzles, having the valve pin sleeve 544 of a nozzle in the blocking position shown in FIG. 21 will delay injection of the interior stream 560 of the second material by that nozzle relative to other nozzles in which the interior stream 560 is not mechanically blocked.

Figure 22:
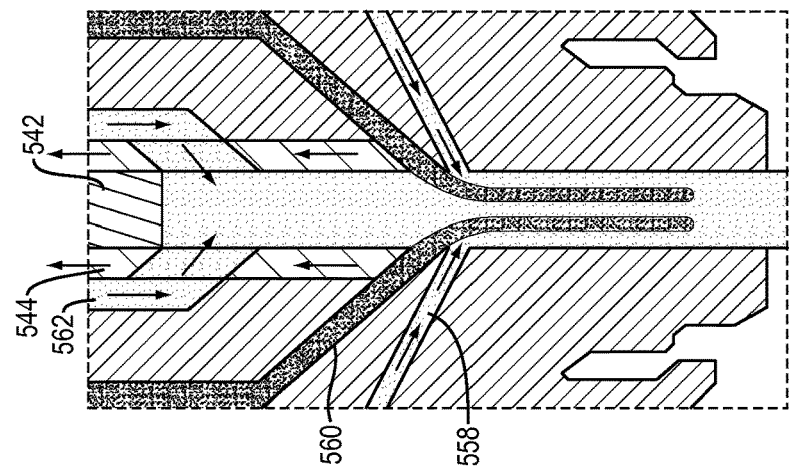
FIG. 22 is a detail of the nozzle assembly of FIG. 21 in a configuration for establishing a flow path combining the interior stream of the second material with the inner stream and the outer stream of the first material.

In the detail of FIG. 22, the valve pin sleeve 544 has been retracted establishing a flow path for the interior stream 560 to flow to the stream combination area 554. Because the second material is at elevated pressure and the flow path is established, the interior stream 560 flows into the combination area 554 to combine with the inner stream 558 and the outer stream 562 forming three-layer flow. Even with the valve pin sleeve 544 in a configuration to establish a flow path for the interior stream 560, the interior stream 560 would not flow into the combination area if the second material were not at elevated pressure. In other words, flow of the interior stream 560 of the second material into the stream combination area 554 requires both sufficient pressure of the second material and a flow path to the stream combination area 554.

Figure 23:
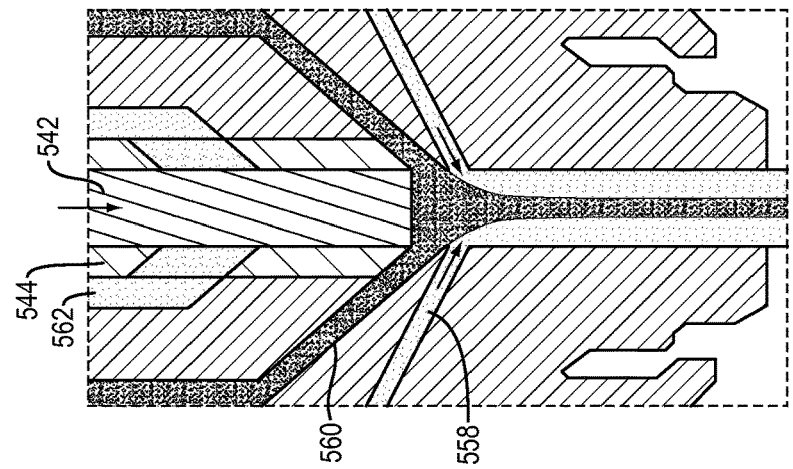
FIG. 23 is a detail of the nozzle assembly of FIG. 21 in a configuration establishing a flow path combining the interior stream of the second material with the inner stream and the outer stream of the first material.

In the detail of FIG. 23, the valve pin core 142 has been advanced blocking the flow path of the inner stream 558 resulting in two-layer flow of the outer stream 562 and of the interior stream 560. As described above, two-layer flow may be employed when a cavity is almost full to close a gap in the interior layer.

In some embodiments, nozzles having selective flow initiation elements for second material flow may be employed to implement methods described above. For example, turning again to FIG. 8, at a time $t_1$, a first nozzle associated with a first cavity $C_1$ may be in the configuration of FIG. 21 with the core valve pin 542 retracted establishing flow paths for the inner stream 562 and the outer stream 558 to the combination area 554, and with the valve pin sleeve 544 blocking the flow path of the interior stream 560 to the combination area 554. At the same time, a second nozzle associated with a second cavity $C_2$ may be in the configuration of FIG. 22 with the core valve pin 542 retracted establishing flow paths for the inner stream 562 and the outer stream 558 to the combination area 554 and with the valve pin sleeve 544 retracted establishing a flow path from the interior stream 560 to the combination area 554. At time $t_1$, the pressure of the first material is raised for all nozzles initiating flow of the first material into cavity $C_1$ (arrow 110) and into cavity $C_2$ (arrow 113).

At time $t_{2'}$, the pressure of the second material is raised for all nozzles. The second nozzle, which is in the configuration of FIG. 22, has a clear flow path for the interior stream 560 of the second material to the combination area 554 and so flow of the second material into cavity $C_2$ is initiated at time $t_{2'}$ (arrow 114) after a skin-core time delay $\Delta_{sc2}$. In contrast, in the first nozzle, which is in the configuration of FIG. 21, the valve pin sleeve 544 blocks the flow path of the interior stream 560 of the second material to the combination area 544. Thus, the increase in pressure of the second material at time $t_{2'}$ does not initiate flow of the second material from the first nozzle into cavity $C_1$.

At time $t_3$, valve pin sleeve 544 is retracted in the first nozzle establishing a flow channel for the interior stream 560 of the second material to the combination area 554, initiating flow of the second material into $C_1$ (arrow 116) after a skin-core time delay $\Delta_{sc1}$.

Figure 25:
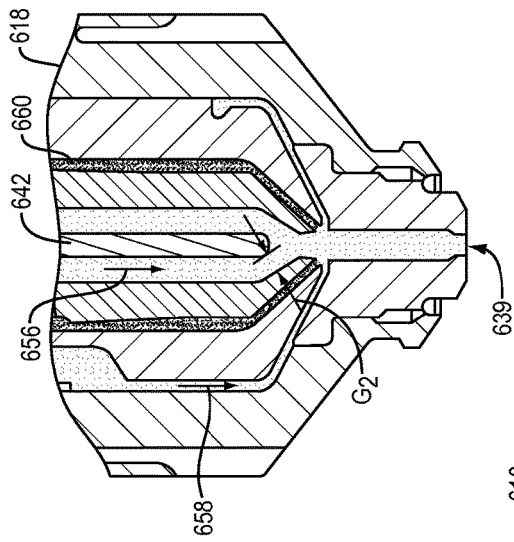
FIG. 25 is a cross-sectional view of the portion of the nozzle with the valve pin in a first restricted flow position, in accordance with an embodiment.
Figure 26:
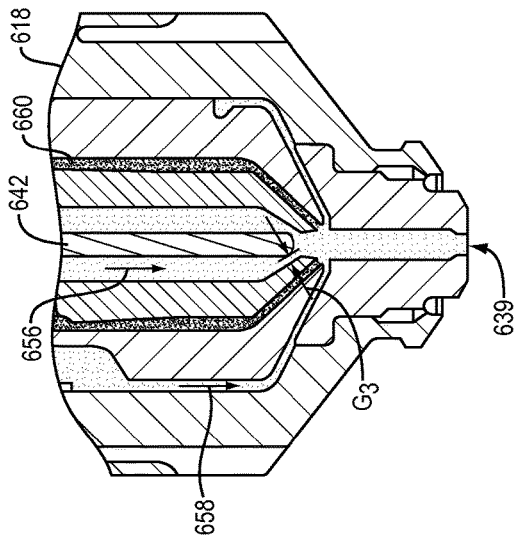
FIG. 26 is a cross-sectional view of the portion of the nozzle with the valve pin in a second restricted flow position, in accordance with an embodiment.
Figure 24:
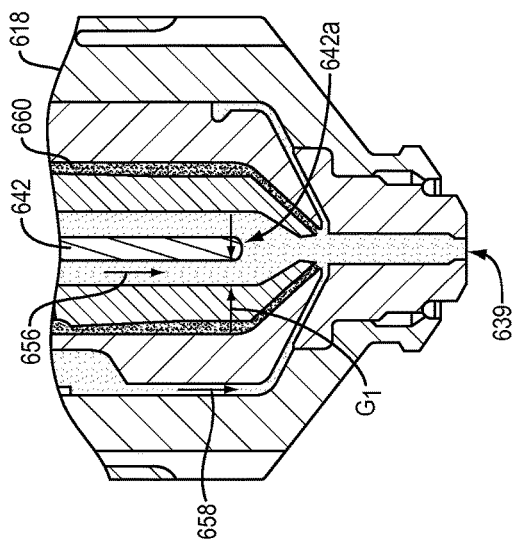
FIG. 24 is a cross-sectional view of a portion of a nozzle with a valve pin in a first unrestricted flow position, in accordance with an embodiment.

Different configurations of valve pins and nozzles may be employed to control a rate of flow of the first material into an individual cavity of the plurality of cavities. For example, FIGS. 24-26 schematically depict control of a rate of flow of a first material (e.g., a skin material) into a cavity using a position of a valve pin in accordance with another embodiment. Control of the flow rate of the first material using a position of a valve pin as described with respect to FIGS. 24-26 below may be employed for performing steps 312 and 314 of method 310 described above.

FIG. 24 schematically depicts a cross-sectional view of an end portion of a nozzle 618 including a flow rate control element for individually controlling a rate of flow of the first material (e.g. a skin material) from an output portion 639 of the nozzle. One of ordinary skill in the art will recognize that nozzle 618 may include many different parts or portions similar to those described above with respect to nozzle assembly 18 of FIG. 4. In nozzle 618 of FIG. 24, the flow rate control element includes a valve pin 642 having a proximal portion 642a, which is proximal relative to the output portion 639 of the nozzle. Although embodiments may include a plurality of nozzles each having an independently controlled flow rate control element, for simplicity, only one nozzle is illustrated in FIGS. 24-26.

FIGS. 24-26 illustrate the end portion of the nozzle 618 after initiation of flow of the inner stream 656 and the outer stream 658 of the first material, but before initiation of flow of the interior stream 660 of the second material for various valve pin positions. In FIG. 24, the valve pin 642 is retracted into an unrestricted flow position in which the position of the valve pin does not restrict flow of the first material. Specifically, further retraction of the valve pin 642 away from the output portion 639 of the nozzle would not increase the flow rate of the first material. In this first unrestricted valve position, a gap $G_1$ between a wall of an annular flow passage for the inner stream 656 and an outer surface of a proximal end of the valve pin 642a is relatively large and does not limit a flow rate of the inner stream 656 of the first material. With the valve pin in the first unrestricted flow position, the first material flows out of the nozzle at an unrestricted flow rate. The unrestricted flow of FIG. 24 is analogous to the promoted flow described above with respect to FIG. 14.

In FIG. 25 the valve pin 642 is retracted into a first restricted flow position in which flow of the first material out of the nozzle is reduced by restricting the flow of the inner stream 656 of the first material. In the first restricted flow position, a gap $G_2$ between the wall of the annular flow passage and the outer surface of a proximal end of the valve pin 642a is smaller than $G_1$, which physically restricts the flow of the inner stream 656 out of the annular flow passage. This restriction in the flow of the inner stream reduces the total flow rate of the first material out of the nozzle 648 to a first restricted flow rate that is smaller than the unrestricted flow rate.

In FIG. 26 the valve pin 642 is retracted into a second restricted flow position that further restricts the flow of the first material out of the nozzle. In the second restricted flow position, a gap $G_3$ between the wall of the annular flow passage for the inner stream 656 and the outer surface of a proximal end of the valve pin 642a is smaller than $G_2$, which further restricts the flow of the inner stream 656 out of the annular flow passage. This further restriction in the flow of the inner stream reduces the total flow rate of the first material out of the nozzle to a second restricted flow rate that is smaller than the first restricted flow rate. The restricted flow of FIGS. 25 and 26 is analogous to the restricted flow described above with respect to FIG. 13, with some differences that are explained below.

Control of the flow rate of the first material from the nozzle prior to initiation of flow of the second material, such as that described with respect to FIGS. 24-26, can be used to address variations in a position of a leading edge of an interior layer from cavity to cavity in a mold. For example, to address the non-uniformities shown in FIG. 6 above, a nozzle for cavity 22b and a nozzle for cavity 22d may each have a valve pin in a second restricted flow position (e.g., like that of FIG. 26), a nozzle for cavity 22a may have a valve pin in a first restricted flow position (e.g., like that of FIG. 25), and a nozzle for cavity 22c may have a valve pin in an unrestricted flow position.

In the embodiment described above with respect to FIG. 13, the position of the valve pin 242 restricts flow of the first material by restricting flow of both the inner stream and the outer stream of the first material. In contrast, in the embodiment shown in FIGS. 25 and 26, a position of the valve pin 642 restricts flow of the first material by restricting flow of the inner stream of the first material while leaving flow of the outer stream of the first material unrestricted. Thus, a position of the valve pin 642 influences a volumetric flow ratio of the inner flow 656 to the outer flow 658 of the first material in the embodiment of FIGS. 25 and 26, unlike the embodiment of FIG. 13.

Figure 29:
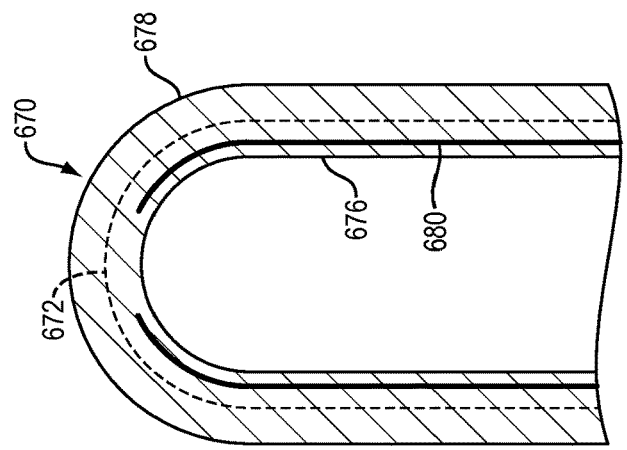
FIG. 29 is a schematic cross-sectional view of a portion of an article resulting from co-injection with the valve pin in a second restricted flow position, in accordance with an embodiment.
Figure 28:
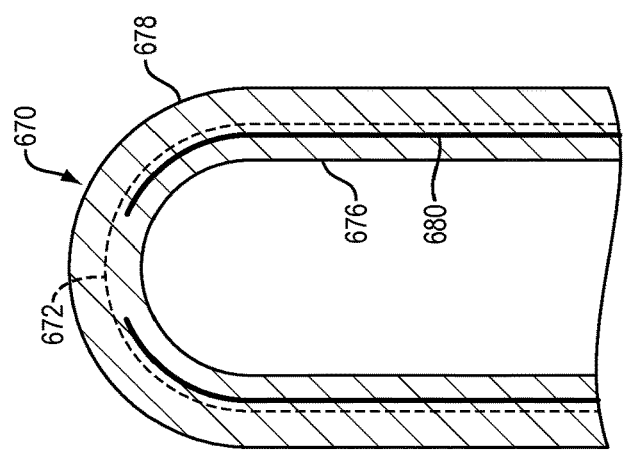
FIG. 28 is a schematic cross-sectional view of a portion of an article resulting from co-injection with the valve pin in a first restricted flow position, in accordance with an embodiment.
Figure 27:
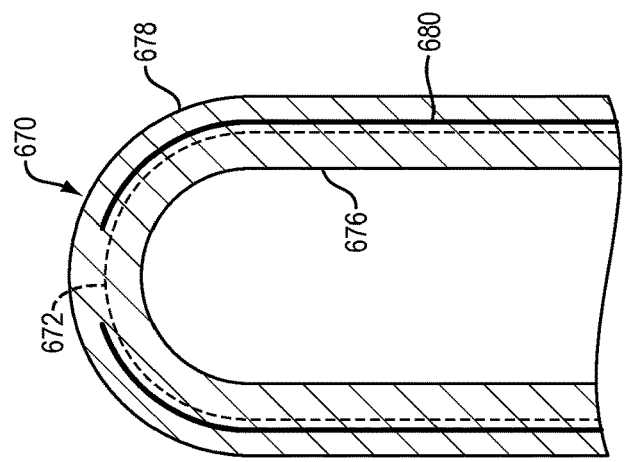
FIG. 27 is a schematic cross-sectional view of a portion of an article resulting from co-injection with a valve pin in an unrestricted flow position, in accordance with an embodiment.

Altering the volumetric flow ratio of the inner flow to the outer flow of the first material alters the placement of the interior core layer in the resulting article. FIGS. 27-29 illustrate how alteration of volumetric flow ratio of the inner flow to the outer flow of the first material alters a placement of the interior layer 680 in a resulting article 670. FIGS. 27-29 schematically depict a cross-section of a portion of a resulting article 670 with dotted line 672 indicating a midline in a thickness of the article wall for reference. In FIGS. 27-29, thicknesses are exaggerated for illustrative purposes.

FIG. 27 corresponds to an article resulting from co-injection with the valve pin in the unrestricted flow position (see FIG. 24). The volumetric flow ratio without any restriction of the inner layer flow places the interior layer 672 toward an outer surface 678 of the article.

FIG. 28 corresponds to an article resulting from co-injection with the valve pin in the first restricted flow position (see FIG. 25). The restriction of the inner flow stream results in a different volumetric flow ratio (i.e., a relatively lower ratio of the inner flow to the outer flow than that for unrestricted first material flow), which places the interior layer 672 toward an inner surface 676 of the article.

FIG. 29 corresponds to an article resulting from co-injection with the valve pin in the second restricted flow position (see FIG. 26). This further restriction of the inner flow stream results in a different volumetric flow ratio (i.e., a relatively lower ratio of the inner flow to the outer flow than for the first restricted flow position), which places the interior layer 672 even further toward the inner surface 676 of the article.

As explained above, in some embodiments, a position of a valve pin may be used to control a placement of the interior layer closer to an inner surface of the resulting article or closer to an outer surface of the resulting article.

In some embodiments, a resulting plastic article may be configured for use as a container (e.g., for containing food, beverages, pharmaceutical, nutraceuticals and/or other gas-sensitive products). Substantially all of the surface area of the article exposed to the product may include an interior layer. As used herein, the term "substantially" or "substantially fully" means 95%-100% coverage of the interior layer across the entire surface area of the article exposed to the container volume for storing product.

FIG. 30 illustrates an exemplary computing environment suitable for practicing exemplary embodiments taught herein. The environment may include a co-injection control device 400 coupled, wired, wirelessly or a hybrid of wired and wirelessly, to co-injection system 10. The co-injection control device 400 is programmable to implement executable Flow Control Code 450 for forming a barrier layer and/or scavenger layer. Co-injection control device 400 includes one or more computer-readable media for storing one or more computer-executable instructions or software for implementing exemplary embodiments. The computer-readable media may include, but are not limited to, one or more types of hardware memory, non-transitory tangible media, etc. For example, memory 406 included in the co-injection control device 400 may store computer-executable instructions or software, e.g., instructions for implementing and processing every module of the executable Flow Control Code 450. Co-injection control device 400 also includes processor 402 and, one or more processor(s) 402' for executing software stored in the memory 406, and other programs for controlling system hardware. Processor 402 and processor(s) 402' each can be a single core processor or multiple core (404 and 404') processor.

Virtualization may be employed in co-injection control device 400 so that infrastructure and resources in the computing device can be shared dynamically. Virtualized processors may also be used with the executable Flow Control Code 450 and other software in storage 416. A virtual machine 414 may be provided to handle a process running on multiple processors so that the process appears to be using only one computing resource rather than multiple. Multiple virtual machines can also be used with one processor.

Memory 406 may include a computer system memory or random access memory, such as DRAM, SRAM, EDO RAM, etc. Memory 406 may include other types of memory as well, or combinations thereof.

A user may interact with co-injection control device 400 through a visual display device 422, such as a computer monitor, which may display the user interfaces 424 or any other interface. The visual display device 422 may also display other aspects or elements of exemplary embodiments, e.g., materials databases, production information, etc. Co-injection control device 400 may include other I/O devices such a keyboard or a multi-point touch interface 408 and a pointing device 410, for example a mouse, for receiving input from a user. The keyboard 408 and the pointing device 410 may be connected to the visual display device 422. Co-injection control device 400 may include other suitable conventional I/O peripherals. Co-injection control device 400 may further include a storage device 416, such as a hard-drive, CD-ROM, or other non-transitory computer readable media, for storing an operating system 418 and other related software, and for storing executable Flow Control Code 450.

Co-injection control device 400 may include a network interface 412 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, controller area network (CAN), or some combination of any or all of the above. The network interface 412 may include a built-in network adapter, network interface card, PCMCIA network card, card bus network adapter, wireless network adapter, USB network adapter, modem or any other device suitable for interfacing authorization computing device 400 to any type of network capable of communication and performing the operations described herein. Moreover, co-injection control device 400 may be any computer system such as a workstation, desktop computer, server, laptop, handheld computer or other form of computing or telecommunications device that is capable of communication and that has sufficient processor power and memory capacity to perform the operations described herein.

Co-injection control device 400 can be running any operating system such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein. The operating system may be running in native mode or emulated mode.

Flow Control Code 450 includes executable code executable by the processor 402 to control the co-injection system 10, which may include individually controlling a position of the valve pin 42 for each nozzle, individually controlling for initiation and controlling flow of the first material stream and controlling flow of the co-polymer stream into each cavity. The executable code executable by the processor 402 may also control a temperature of at least portions of the gate pin 42, and control a temperature of at least portions of the mold 2400. The executable code may be executable by the processor 402 to selectively control a volumetric flow volume of the inner and outer polymeric streams, control a position of the interior core material stream relative to a velocity flow front of the combined polymeric stream, and control extrusion start time of the interior core stream relative to the extrusion start time of the inner and outer polymeric streams for each cavity. Co-injection systems taught herein facilitate the co-injection molding of articles such as food or beverage containers.

In some embodiments, a co-injection control device may be located proximate to the co-injection system and configured to control one co-injection system. In some embodiments, co-injection control device may be located remotely, for example, as a server, and configured to control one, two, three, four, or more co-injection systems.

As may be recognized by those of ordinary skill in the pertinent art based on the teachings herein, numerous changes and modifications may be made to the above-described and other embodiments of the present disclosure without departing from the spirit of the invention as defined in the appended claims. Accordingly, this detailed description of embodiments is to be taken in an illustrative, as opposed to a limiting, sense. Those skilled in the art will recognize, or be able to ascertain using no more than routine experimentation, many equivalents to the specific embodiments of the described herein. Such equivalents are intended to be encompassed by the following claims.

What is claimed is:

1. A method of individually controlling a position of a leading edge of an interior layer during co-injection molding of a plurality of multi-layer articles using a corresponding plurality of cavities of a mold, the method comprising:
   for each cavity in the plurality of cavities, individually controlling a flow rate of a first material into each cavity using a position of a valve pin in a corresponding nozzle of a plurality of nozzles, each nozzle of the plurality of nozzles configured to form a three-layer combined polymeric plastic flow stream therein, the three-layer combined polymeric plastic flow stream comprising an interior stream of a second material encased by an inner stream of the first material and an outer stream of the first material;
   for each cavity in the plurality of cavities, co-injecting from the corresponding nozzle of the plurality of nozzles the second material into the respective cavity with the first material using the corresponding nozzle thereby forming the interior layer of the second material between the inner layer of the first material and the outer layer of the first material in the respective cavity; and
   for each cavity in the plurality of cavities, blocking flow of the inner stream of the first material within the corresponding nozzle with the valve pin to cease flow of the inner stream while continuing flow of the outer stream of the first material and flow of the interior stream of the second material into the cavity to form a two-layer combined polymeric plastic flow stream.

2. The method of claim 1, wherein individually controlling the flow rate includes at least setting a first flow rate of the first material into a first cavity of the plurality of cavities using a first position of a first valve pin in a first nozzle of the plurality of nozzles and setting a second flow rate, different than the first flow rate, using a second position of a second valve pin in a second nozzle of the plurality of nozzles, and
   whereby individually controlling the flow rate of the first material into each of the plurality of cavities individually controls a position of a leading edge of the interior layer of the second material in each resulting one of the plurality of multi-layer articles.

3. The method of claim 1, further comprising, for each cavity in the plurality of cavities, individually controlling a total flow rate of material into the cavity using the position of the valve pin of the corresponding nozzle after initiation of co-injection of the second material.

4. The method of claim 1, wherein, for each cavity in the plurality of cavities, a profile for a flow rate of the first material into the cavity is automatically adjusted based on a detected property of an article previously produced using the cavity.

5. The method of claim 1, wherein blocking flow of the inner stream of the first material within the corresponding nozzle comprises retracting a valve pin of the nozzle away from the cavity.

6. The method of claim 1, further comprising delaying initiation of flow of the first material into a second cavity of the plurality of cavities relative to initiation of flow of the first material into a first cavity of the plurality of cavities.

7. The method of claim 1, wherein a time delay between initiation of flow of the first material into a cavity and initiation of co-injection of the second material into the cavity is a skin-core time delay for the cavity, and wherein the method further comprises specifying a first skin-core time delay for a first cavity in the plurality of cavities and specifying a second skin-core time delay different than the first skin-core time delay for a second cavity in the plurality of cavities.

8. A method of individually controlling a position of a leading edge of an interior layer during forming of a plurality of multilayer injection-molded articles using a corresponding plurality of cavities of a mold, the method comprising:
   initiating injection of a first material at a first time into a first cavity of the plurality of cavities using a first nozzle with a valve pin of the first nozzle in a first position before co-injection of a second material into the first cavity, the first nozzle configured to form a three-layer combined polymeric plastic flow stream therein, the three-layer combined polymeric plastic flow stream comprising an interior stream of a second material encased by an inner stream of the first material and an outer stream of the first material;
   initiating injection of the first material at a second time different than the first time into a second cavity of the plurality of cavities using a second nozzle with a valve pin of the second nozzle in a second position different than the first position, thereby restricting flow of the first material into the second cavity before co-injection of the second material into the second cavity, the second nozzle configured to form a three-layer combined polymeric plastic flow stream therein, the three-layer combined polymeric plastic flow stream comprising an interior stream of the second polymeric material encased by an inner stream of the first polymeric material and an outer stream of the first polymeric material;

co-injecting the second material after a first time delay relative to the first time into the first cavity with the first material using the first nozzle thereby forming an interior layer of the second material between an inner layer of the first material and an outer layer of the first material in the first cavity; and co-injecting the second material after a second time delay relative to the second time into the second cavity with the first material using the second nozzle thereby forming an interior layer of the second material between an inner layer of the first material and an outer layer of the first material in the second cavity, and using the valve pin of the first nozzle to individually control the position of a leading edge of the interior layer in a first resulting multilayer injection-molded article formed in the first cavity and using the valve pin of the second nozzle to individually control the position of a leading edge of the interior layer in a second resulting multilayer injection-molded article formed in the second cavity.

9. The method of claim 8, wherein a first flow rate of the first material into the first cavity before co-injection of the second material into the first cavity is controlled using positioning of the valve pin of the first nozzle and wherein a second flow rate of the first material into the second cavity before co-injection of the second material into the second cavity is controlled using positioning of the valve pin of the second nozzle.

10. The method of a claim 9, wherein the first flow rate of the first material into the first cavity is determined based on an article previously produced using the first cavity and wherein the second flow rate of the first material into the second cavity is determined based on an article previously produced using the second cavity.

11. The method of claim 8, further comprising delaying initiation of flow of the first material into the second cavity relative to initiation of flow of the first material into the first cavity.

12. The method of claim 8, wherein the first time delay between initiation of flow of the first material into the first cavity and initiation of co-injection of the second material into the first cavity and the second time delay between initiation of flow of the first material into the second cavity and initiation of co-injection of the second material into the second cavity differ from one another.

13. The method of claim 8, wherein the method further comprises for each nozzle of the first nozzle and the second nozzle, blocking flow of the inner stream of the first material within the nozzle to cease flow of the inner stream while continuing flow of each of the outer stream of the first material and of the interior stream of the second material.

14. The method of claim 13, wherein blocking flow of the inner stream of the first material within the nozzle comprises retracting a valve pin of the nozzle away from the corresponding cavity.

* * * * *

UNITED STATES PATENT AND TRADEMARK OFFICE
CERTIFICATE OF CORRECTION

PATENT NO. : 10,144,161 B2
APPLICATION NO. : 14/210350
DATED : December 4, 2018
INVENTOR(S) : John Duffy et al.

Page 1 of 1

It is certified that error appears in the above-identified patent and that said Letters Patent is hereby corrected as shown below:

In the Claims

Column 31, Line 61 (Claim 1): "the inner layer" is to be replaced with -- an inner layer --;

Column 31, Lines 61-62 (Claim 1): "the outer layer" is to be replaced with -- an outer layer --; and Column 34, Line 4 (Claim 10): "The method of a claim 9" is to be replaced with -- The method of claim 9 --.

Signed and Sealed this
Sixteenth Day of April, 2019

Andrei Iancu
*Director of the United States Patent and Trademark Office*